United States Patent
Ume et al.

(10) Patent No.: US 12,322,018 B2
(45) Date of Patent: Jun. 3, 2025

(54) LATENT SPACE EDITING AND NEURAL ANIMATION TO GENERATE HYPERREAL SYNTHETIC FACES

(71) Applicant: Metaphysic Limited, London (GB)

(72) Inventors: Chris Ume, Bangkok (TH); Jo Plaete, London (GB); Martin Adams, Cheltenham (GB); Thomas Graham, London (GB)

(73) Assignee: Metaphysic Limited, London (GB)

( * ) Notice: Subject to any disclaimer, the term of this patent is extended or adjusted under 35 U.S.C. 154(b) by 176 days.

(21) Appl. No.: 18/089,487

(22) Filed: Dec. 27, 2022

(65) Prior Publication Data

US 2024/0212249 A1   Jun. 27, 2024

(51) Int. Cl.
| | |
|---|---|
| *G06T 13/40* | (2011.01) |
| *G06N 20/00* | (2019.01) |
| *G06T 13/20* | (2011.01) |
| *G06T 19/00* | (2011.01) |
| *G10L 13/033* | (2013.01) |

(52) U.S. Cl.
CPC .............. *G06T 13/40* (2013.01); *G06N 20/00* (2019.01); *G06T 13/205* (2013.01); *G06T 19/006* (2013.01); *G10L 13/033* (2013.01)

(58) Field of Classification Search
None
See application file for complete search history.

(56) References Cited

U.S. PATENT DOCUMENTS

| | | | |
|---|---|---|---|
| 11,475,608 B2 | 10/2022 | Theobald | |
| 2020/0302667 A1* | 9/2020 | del Val Santos | G06N 3/044 |
| 2021/0027511 A1 | 1/2021 | Shang et al. | |
| 2021/0049468 A1 | 2/2021 | Karras et al. | |
| 2021/0056348 A1* | 2/2021 | Berlin | G06T 11/60 |
| 2022/0309724 A1* | 9/2022 | Richard | G10L 25/57 |
| 2023/0061761 A1* | 3/2023 | Rothschild | G10L 21/10 |
| 2023/0319223 A1* | 10/2023 | Naruniec | H04N 5/272 348/239 |
| 2023/0342893 A1* | 10/2023 | Hinz | G06T 5/60 |
| 2023/0343010 A1* | 10/2023 | Kwatra | G06T 17/20 |
| 2024/0028676 A1* | 1/2024 | Singh | G06F 21/64 |
| 2024/0144568 A1* | 5/2024 | Gururani | G06V 10/82 |

FOREIGN PATENT DOCUMENTS

WO    WO2021155140 A1    8/2021

OTHER PUBLICATIONS

The PCT Search Report and Written Opinion Dated Apr. 23, 2024 for PCT Application No. PCT/US23/85694, 9 pages.

* cited by examiner

*Primary Examiner* — Frank S Chen
(74) *Attorney, Agent, or Firm* — Lee & Hayes, P.C.

(57) ABSTRACT

Using latent space manipulation and neural animation to generate hyperreal synthetic faces is described. A machine learning model(s) may be trained to generate a synthetic face of a subject featured in unaltered video content based at least in part on video data of an actor making a mouth-generated sound or a three-dimensional (3D) model of a face of the subject that has been animated in accordance with the mouth-generated sound. Latent space manipulation and neural animation may be used with the trained machine learning model(s) to generate instances of the synthetic face, and the instances of the synthetic face can be used to create altered video content featuring the subject with the synthetic face making the mouth-generated sound.

20 Claims, 10 Drawing Sheets

LATENT SPACE EDITING AND NEURAL ANIMATION TO GENERATE HYPERREAL SYNTHETIC FACES

BACKGROUND

Hyperreal synthetic content is a key component to the ongoing development of the metaverse. "Synthetic," in this context, means content created using artificial intelligence (AI) tools. For example, generative adversarial networks (GANs) can generate synthetic faces based on training data. Synthetic content is "hyperreal" when the synthetic content is so realistic that a human can't tell if it was recorded in real life or created using AI tools.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
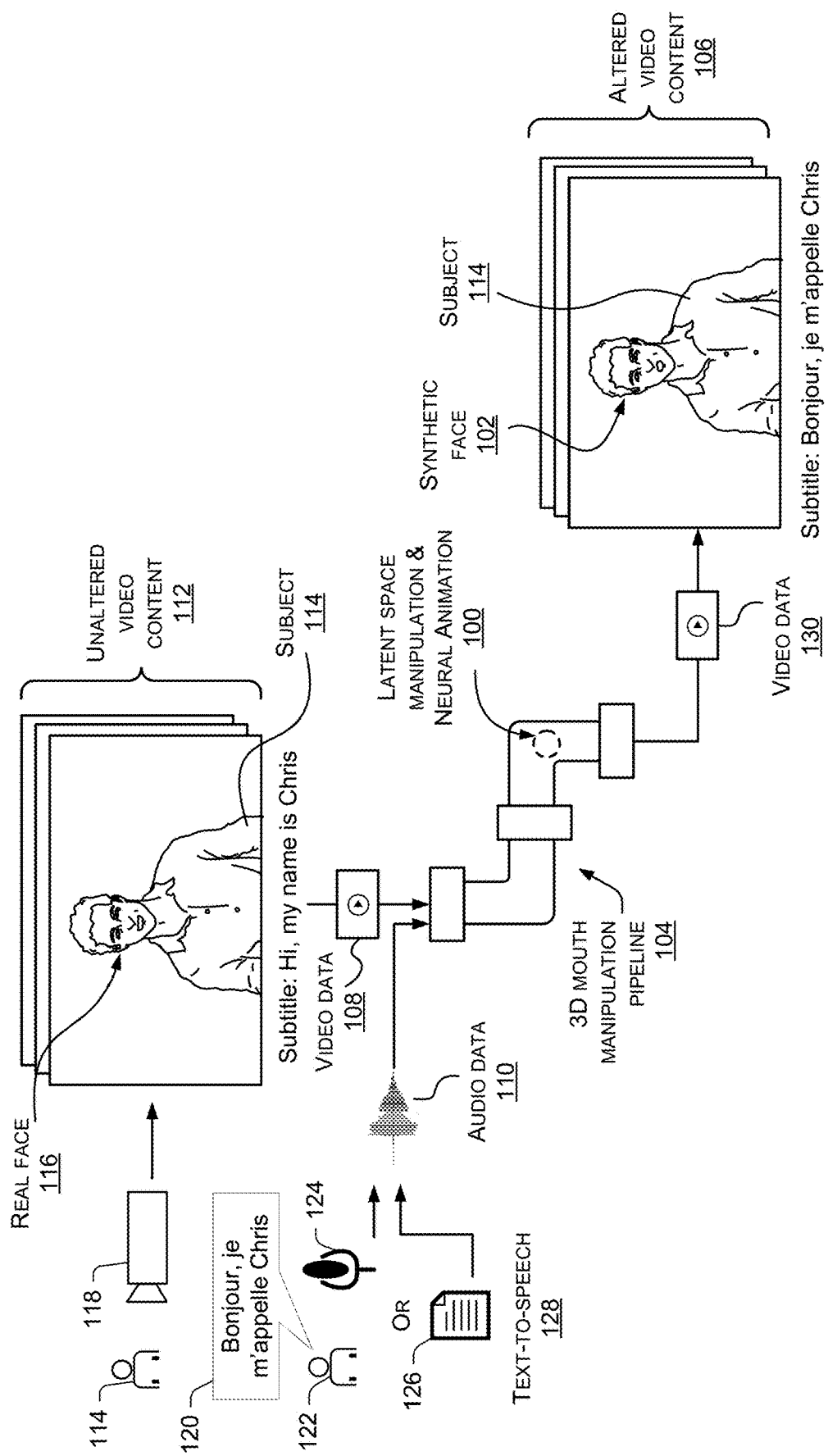
FIG. 1 is a diagram illustrating an example technique for using latent space manipulation and neural animation to generate hyperreal synthetic faces.

Synthetic faces generated using existing technologies often exhibit unnatural-looking facial expressions (e.g., mouth movements). As such, the "hyperreal" bar has not been met by existing technologies, and even if hyperreal synthetic content has been created on occasion, such hyperreal synthetic content is not reproducible at scale.

Described herein are, among other things, techniques, devices, and systems for using latent space manipulation and neural animation to generate hyperreal synthetic faces. The disclosed techniques may include receiving input video data corresponding to unaltered video content. The unaltered video content may feature a subject (e.g., a person) with a face making a mouth-generated sound. For example, the unaltered video content may represent original footage of an actor saying something (e.g., a line from a movie). Audio data may also be received as input, wherein the audio data corresponds to a different mouth-generated sound. For example, a voice actor may be recorded while speaking a first language different than a second language spoken by the subject in the unaltered video content. Using the various techniques described herein, altered video content may be created, wherein the altered video content features the subject in the original footage with a hyperreal synthetic face making the different mouth-generated sound included in the input audio data. For example, the altered video content may feature an actor with a hyperreal synthetic face saying something that the actor did not actually say in the original footage. The synthetic face of the subject in the altered video content may be indiscernible from the actual, real life subject making the same mouth-generated sound. This makes the synthetic face in the altered video content hyperreal.

To generate the hyperreal synthetic face of the subject featured in the unaltered video content, various operations may be performed. Initially, in some examples, the input audio data corresponding to a mouth-generated sound may be used to animate a 3D model of a face that represents the subject. For example, if the audio data corresponds to a first spoken utterance in a first language, such as the French language phrase "Bonjour, je m'appelle Chris," the 3D model of the face may be animated with facial expressions (e.g., mouth expressions) that correspond to the first spoken utterance. The 3D model may then be aligned with 2D representations of the face depicted in frames of the unaltered video content to obtain aligned instances of the 3D model having respective facial expressions (e.g., mouth expressions) based at least in part on the animating. A machine learning model(s) may then be trained to generate a synthetic face of the subject featured in the unaltered video content based at least in part on the aligned instances of the 3D model to obtain a trained machine learning model(s). This trained machine learning model(s), once trained, can be used to generate instances of the synthetic face corresponding to the aligned instances of the 3D model. In some examples, as an alternative, or in addition, to using a 3D model, video data of an actor making the mouth-generated sounds may be used to train the machine learning model(s), as described herein. In addition, latent space manipulation and neural animation may be used to improve or alter the quality of the synthetic face that is generated by the trained machine learning model(s). For example, the use of latent space manipulation and neural animation may allow for generating the synthetic face with enhanced facial expressions (e.g., mouth expressions) that are more natural-looking than without the use of latent space manipulation.

In machine learning, "latent space" is a representation of the compressed data stored by a machine learning model as the model learns the features of the training dataset. Latent space manipulation (or editing) and neural animation techniques are disclosed herein. "Neural animation," as used herein, is a layer that sits on top of latent space manipulation, where neural animation drives the manipulation of latent space in a specific way. In the context of the present disclosure, vectors in latent space are driven by neural animation to generate hyperreal synthetic faces. Accordingly, the techniques disclosed herein involve applying a neural animation vector to a point within a latent space associated with the trained machine learning model(s) to obtain a modified latent space point, and then generating a synthetic face using the trained machine learning model(s) based at least in part on the modified latent space point. In an example, the trained machine learning model(s) may include a first trained machine learning model and a second trained machine learning model, and the latent space point may be a point within a latent space of the first trained machine learning model whose latent space is synchronized with the latent space of the second trained machine learning model. After modifying this latent space point, the modified latent space point may be provided to the second trained machine learning model (e.g., to the model's decoder) to generate an image of a synthetic face having a facial expression (e.g., a mouth expression) that is more or less expressive (e.g., slightly more open, or slightly more closed), as compared to generating the synthetic face using the trained machine learning model(s) without latent space manipulation and/or neural animation. This provides synthetic (AI-generated) face that is hyperreal. The hyperreal characteristic of the synthetic face is due, in part, to the facial expressions (e.g., mouth expressions) looking more natural, which is a product of the latent space manipulation and neural animation described herein.

The synthetic face generated using the techniques described herein can be included in altered video content featuring the subject in the original footage. Specifically, the synthetic face in the altered video content can exhibit facial expressions (e.g., mouth expressions) corresponding to the mouth-generated sound included in the audio data. For example, instances of the synthetic face may be overlaid on the 2D representations of the subject's face within the frames of the unaltered video content to generate video data corresponding to altered video content featuring the subject with the synthetic face saying something that the subject did not actually say in the original footage. The altered video content may then be displayed in any suitable environment and/or on any suitable device with a display, such as on a display of a user computing device, in the context of a metaverse environment, or in any other suitable manner.

The techniques and systems described herein can be used in various applications. One example application is lip-syncing. For example, the altered video content may feature the subject in the original footage with a synthetic face exhibiting mouth movements (e.g., saying something) to match the mouth-generated sound (e.g., spoken utterance) included in the input audio data. In this manner, the techniques and systems described herein can be used in lip-syncing applications to make it appear, in the altered video content, that the subject is saying something he/she did not actually say. Another example application is language translation. For example, the unaltered video content may feature the subject saying something in a first language, and the input audio data may include a direct translation of this spoken utterance in a second language different from the first language. As such, the altered video content may feature the subject in the original footage with a synthetic face exhibiting mouth movements that match the spoken utterance translated into the second language. In this manner, the techniques and systems described herein can be used in language translation applications to make it appear, in the altered video content, that the subject is saying something in a different language, even if the real-life subject is not actually fluent in that different language.

The techniques and systems described herein may provide an improved experience for consumers of synthetic content, such as participants of the metaverse. This is at least because, as compared to synthetic faces generated using existing technologies, the techniques and systems described herein allow for generating synthetic content (e.g., a synthetic face) that is hyperreal by virtue of latent space manipulation and neural animation causing the facial expressions (e.g., mouth movements) of the synthetic face to look more natural. Accordingly, the techniques and system described herein provide an improvement to computer-related technology. That is, technology for generating synthetic faces using AI tools is improved by the techniques and systems described herein for generating synthetic faces of higher quality (e.g., synthetic faces that are more realistic), as compared to those generated with existing technologies.

Furthermore, existing approaches for improving the output of a machine learning model that is trained to generate a synthetic face are limited. For example, attempts can be made to re-train the machine learning model using a different approach and/or different training data in hopes that the model will produce a different, desired output. However, such methods are time-consuming and too ad hoc to allow for reproducing hyperreal synthetic content (e.g., synthetic faces) at scale with repeatability. As another example, the subject in the original footage can be instructed make overly expressive facial expressions at a time of recording the original footage in hopes of compensating for the machine learning model's limitations. However, this is also an approach that is infeasible in many scenarios, and it doesn't allow for altering existing video content. The techniques and systems described herein address these drawbacks by using latent space manipulation and neural animation in a process for generating synthetic faces that are hyperreal.

In addition, the techniques and systems described herein may further allow one or more devices to conserve resources with respect to processing resources, memory resources, networking resources, etc., in the various ways described herein. For example, the techniques and systems described herein allow for creating hyperreal synthetic content without having to use a multitude of cameras to film a subject performing a scene. Instead, resources can be conserved through the streamlined techniques described herein to generate hyperreal synthetic content exclusively from input video data corresponding to original footage of a subject and input audio data corresponding to a mouth-generated sound. These technical benefits are described in further detail below with reference to the figures.

FIG. 1 is a diagram illustrating an example technique for using latent space manipulation and neural animation 100 to generate hyperreal synthetic faces, such as the hyperreal synthetic face 102. In FIG. 1, a 3D mouth manipulation pipeline 104 is utilized to create altered video content 106 with the synthetic face 102 from input video data 108 and input audio data 110. The input video data 108 corresponds to unaltered video content 112 featuring a subject 114 with a real face 116. FIG. 1 depicts an example where the subject 114 is a person, but other types of subjects 114 with faces are contemplated, such as animals (e.g., monkeys, gorillas, etc.), anthropomorphic robots, avatars, other digital characters, and the like. In some examples, the subject 114 (e.g., person) featured in the unaltered video content 112 may be an actor, such as a famous actor or a celebrity. Accordingly, the unaltered video content 112 may, in some examples, represent a movie, a show, or some other form of produced video content, or perhaps a clip or snippet thereof. In some examples, the subject 114 (e.g., person) may be a body-double (e.g., a look-alike) of a famous actor or celebrity.

In some examples, the unaltered video content 112 features the subject 114 (e.g., person) making a mouth-generated sound, such as a spoken utterance. For example, the unaltered video content 112 may feature the subject 114 (e.g., person) saying something in English, such as the English language phrase "Hi, my name is Chris." The input video data 108 corresponding to the unaltered video content 112 may be generated in various ways. FIG. 1 illustrates an example where the subject 114 is recorded (e.g., filmed) using a video camera 118. The video camera 118 can be any suitable type of camera ranging from a typical camera included in a mobile phone to a high-end camera used by filmmakers. The unaltered video content 112 is sometimes referred to herein as the "original footage" that is to be altered.

The input audio data 110 corresponds to a mouth-generated sound, such as a spoken utterance 120. In some examples, this spoken utterance 120 is an utterance that the subject 114 in the original footage did not speak himself/herself. In the example of FIG. 1, the audio data 110 corresponds to the French language phrase "Bonjour, je m'appelle Chris." Consider an example where the subject 114 is a famous, English-speaking actor who does not know how to speak French. Accordingly, the average viewing user may expect the subject 114 to speak English, and may be surprised to hear the subject 114 speaking French.

The input audio data 110 corresponding to mouth-generated sound may be generated in various ways. FIG. 1 illustrates an example where a person 122 is recorded using a microphone(s) 124, such as a microphone of an audio recording device. The person 122 may represent a voice actor who is hired to record a voiceover for the altered video content 106. In the example of FIG. 1, the person 122 may be a native, French-speaking voice actor. In some examples, the person 122 may be recorded with a video camera instead of, or in addition to, being recorded with an audio-only recording device. That is, a video camera, such as the video camera 118, may be used to record the person 122 making a mouth-generated sound, resulting in video data that includes the audio data 110, the video data also including video frames depicting the person 122 (e.g., the face of the person 122) while making the mouth-generated sound (e.g., the spoken utterance 120). Alternatively, the audio data 110 may be generated from text 126 using text-to-speech software 128. For example, the text "Bonjour, je m'appelle Chris" may be converted into speech by the text-to-speech software 128, such that the audio data 110 corresponds to a synthetic voice. Using text-to-speech software 128 to generate the audio data 110 allows for generating the audio data 110 without having to rely on a person 122 to make the mouth-generated sound.

In general, the 3D mouth manipulation pipeline 104 may represent a process implemented by a computing device(s) (or a processor(s) thereof). This computer-implemented process may be for generating video data 130 corresponding to the altered video content 106. An example objective of implementing this process may be to create altered video content 106 of the subject 114 saying something he/she did not say. In some examples, this objective is to change what the subject 114 said in the unaltered video content 112 (the original footage). In the example of FIG. 1, the output video data 130 corresponds to altered video content 106 of an English-speaking subject 114 saying something in French, which the subject 114 did not actually say. In this case, the altered video content 106 features the subject 114 with a hyperreal synthetic face 102 speaking the spoken utterance 120 included in the audio data 110; namely, the French-language phrase "Bonjour, je m'appelle Chris." In other examples, the objective may be to make the subject 114 look different in the altered video content 106 without the subject 114 saying something he/she did not say, or otherwise changing what the subject 114 said in the original footage. For example, if the unaltered video content 112 represents a scene from a movie, the altered video content 106 may feature the subject 114 with a hyperreal synthetic face 102 making facial expressions that the subject 114 did not make in the original footage. Such facial expressions may not be significantly different from the facial expressions of the subject 114 in the original footage, but they may nevertheless make the subject 114 more expressive (e.g., to improve the subject's performance in the scene). In such examples, the input audio data 110 may represent the audio data 110 corresponding to the audio track of the unaltered video content 112, or there may not be any input audio data. Because the techniques and systems described herein use latent space manipulation and neural animation 100 to generate synthetic faces, the altered video content 106 featuring the synthetic face 102 of the subject 114 looks convincing to a viewing user from a visual standpoint. In some examples, machine learning may also be used to generate a synthetic voice of the subject 114 that sounds like the subject 114. In this manner, the altered video content 106 can also sound convincing to a consuming user from an audio standpoint. That is, the subject 114 in the altered video content 106 may not only look like the real subject 114 making natural-looking facial expressions, but the subject 114 may also sound like the real subject 114.

Reference will now be made to FIGS. 2-5 to describe various operations that may be performed to generate hyperreal synthetic faces of the subject 114 featured in the unaltered video content 112. In other words, the techniques and operations described with reference to FIGS. 2-5 may represent operations that are part of the 3D mouth manipulation pipeline 104 of FIG. 1.

Figure 2:
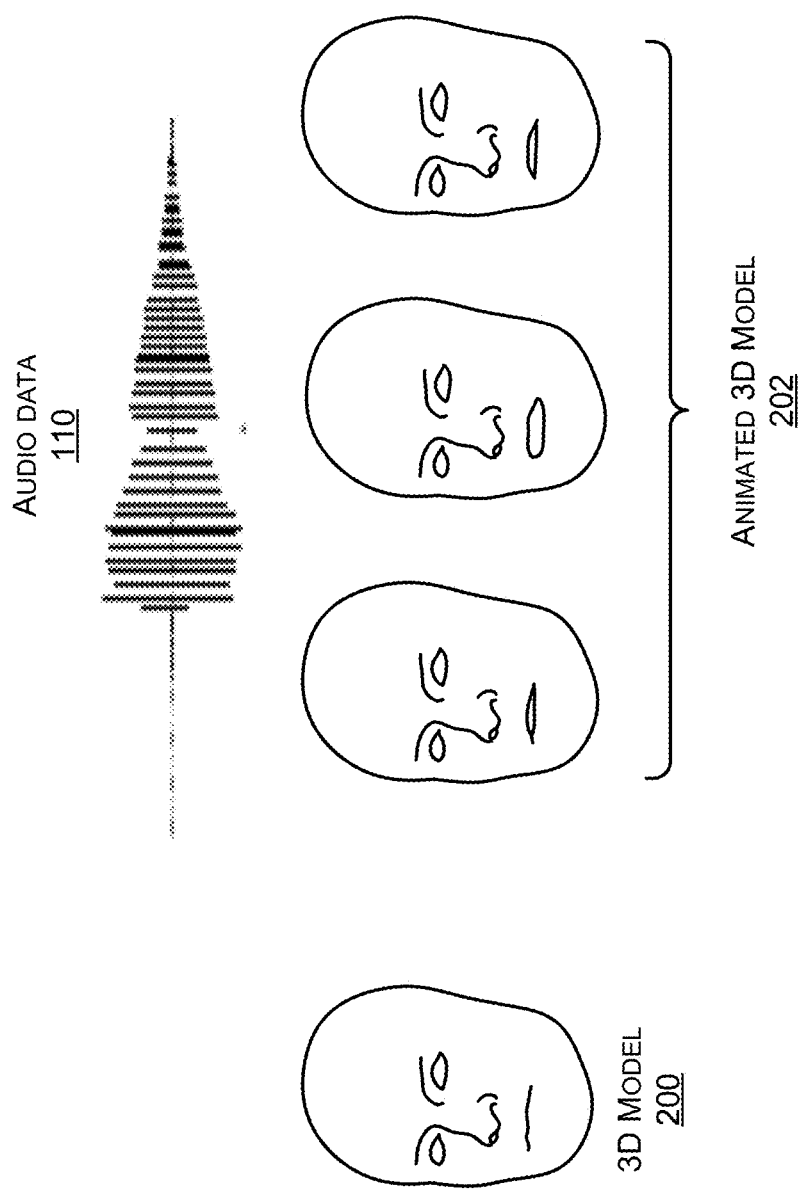
FIG. 2 is a diagram illustrating an example technique for animating a three-dimensional (3D) model of a face based on audio data as part of a process for generating hyperreal synthetic faces.

FIG. 2 is a diagram illustrating an example technique for animating a 3D model 200 of a face based on audio data 110 corresponding to a mouth-generated sound (e.g., a spoken utterance 120). As mentioned, the animating technique depicted in FIG. 2 may be performed as part of the 3D mouth manipulation pipeline 104 depicted in FIG. 1. In some examples, the audio data 110 causes the 3D model 200 to exhibit facial expressions (e.g., mouth expressions, such as mouth movements, cheek movements, eyebrow movements, eye movements, etc.) that correspond to the mouth-generated sound (e.g., the spoken utterance 120) included in the audio data 110. Accordingly, FIG. 2 illustrates an animated 3D model 202 exhibiting facial expressions (e.g., mouth movements) based on the audio data 110.

The face of the 3D model 200 may be made to look like the face of the subject 114 in the unaltered video content 112 (the original footage). For example, the 3D model 200 may have the same or similar facial features (e.g., nose, cheekbones, brow line, chin, forehead, etc.) with the same or similar shapes, measurements, dimensions, etc. as the subject 114. The 3D model 200 can be created in various ways. In one example, the 3D model 200 is created based on a 3D scan of the subject 114. For example, the subject 114 may agree to have his/her face 116 (and/or head, body, etc.) scanned using a 3D scanner that maps the features and contours of at least the face 116 of the subject 114 to generate the 3D model 200. As another example, an artist may hand-craft the 3D model 200 using any suitable tools, such as clay sculpting material, 3D-modeling software, etc. In some examples, the artist may utilize data (e.g., images, video, etc.) of the subject 114 in the process of creating the hand-crafted 3D model 200. Before animation, the 3D model 200 may be a static 3D model that a user can manipulate (e.g., move, such as by rotating the 3D model 200 in space with roll, pitch, and/or yaw rotation) using 3D-modeling software.

The animation of the 3D model 200 based on the audio data 110 may be implemented in various ways. For example, the 3D model 200 may be animated based on a face capture technique. Animating the 3D model 200 based on a face capture technique may involve video recording (e.g., filming) a person (e.g., an actor) making the mouth-generated sound (e.g., the spoken utterance 120) included in the audio data 110 while dots or other markers distributed over the face of the person being recorded are tracked by the video camera that is recording the person. Face capture data may be generated as a result of this face capture technique, such as data indicating how the dots/markers on the person's face move as the person is making the mouth-generated sound. This face capture data may then be used to animate (e.g., move parts of) the 3D model 200 in the same or a similar manner as the recorded person. Accordingly, the animated 3D model 202 may exhibit face (e.g., mouth, jaw, and/or eye, etc.) movements that are based at least in part on the audio data 110.

As another example, the 3D model 200 may be animated using a machine learning model that is configured to generate poses of the 3D model 200 based on input text. For example, the audio data 110 may be converted from speech-to-text, and the resulting text may be provided as input to a trained machine learning model(s) that generates, as output, a series of instances of the 3D model 200 with varying facial expressions (e.g., mouth expressions).

Regardless of the technique used to animate the 3D model 200, an animated 3D model 202 of the likeness of the subject 114 is generated as a result of this animation. In other words, the animated 3D model 202 may exhibit facial expressions (e.g., mouth movements) that correspond to the mouth-generated sound (e.g., spoken utterance 120) included in the audio data 110. Continuing with the example of FIG. 1, the animated 3D model 202 may exhibit facial expressions (e.g., mouth movements) corresponding to the French-language phrase "Bonjour, je m'appelle Chris."

In some examples, data associated with the unaltered video content 112 may be used to create the animated 3D model 202. For example, the shading, lighting, and/or other aspects of the original footage of the subject 114 may be replicated for the animated 3D model 202 to make the animated 3D model 202 look similar to the face 116 of the subject 114 in the original footage. That is, the same or similar shading, lighting, and/or other conditions may be applied when rendering the animated 3D model 202. Notably, the animated 3D model 202 may look somewhat realistic, but not necessarily to the level of a hyperreal synthetic face. Accordingly, the additional operations described with reference to FIG. 3-5 may be performed in order to achieve a hyperreal synthetic face to include in the altered video content 106.

Figure 3:
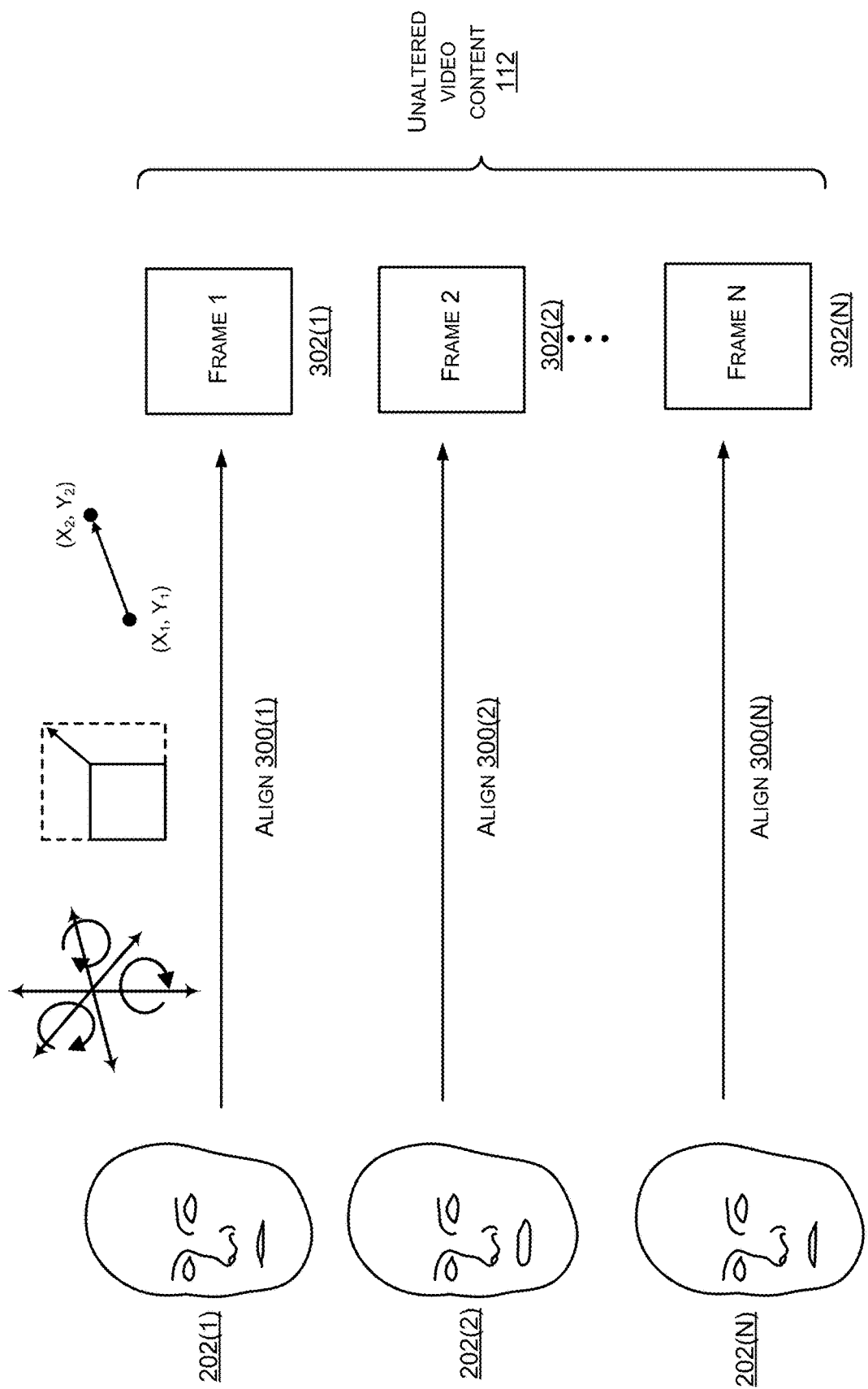
FIG. 3 is a diagram illustrating an example technique for aligning a 3D model with two-dimensional (2D) representations of a face depicted in frames of unaltered video content as part of a process for generating hyperreal synthetic faces.

FIG. 3 is a diagram illustrating an example technique for aligning 300 the animated 3D model 202 with 2D representations of the face 116 of the subject 114 depicted in frames 302 of the unaltered video content 112. As mentioned, the aligning technique depicted in FIG. 3 may be performed as part of the 3D mouth manipulation pipeline 104 depicted in FIG. 1. FIG. 3 depicts multiple instances of the 3D model 202(1)-(N), such as those resulting from animating the 3D model 200, as described with reference to FIG. 2. The alignment 300 of the 3D model 202 may include changing the orientation of the 3D model 202, resizing the 3D model 202, and/or changing the position of the 3D model 202 within the corresponding frame 302. For example, if Frame 1 302(1) features a 2D representation of the face 116 of the subject 114 from a certain angle (e.g., a profile view of the face 116), the instance of the animated 3D model 202(1) may be oriented (e.g., rotated with roll, pitch, and/or yaw rotation) to align the 3D model 202(1) with that 2D representation of the face 116 in Frame 1 302(1) (e.g., to orient the instance of the 3D model 202(1) in a profile view). Additionally, or alternatively, the instance of the 3D model 202(1) may be resized to match the size of the 2D representation of the face 116 in Frame 1 302(1). Additionally, or alternatively, the instance of the 3D model 202(1) may be positioned at an X, Y position within Frame 1 302(1) to overlay the 3D model 202(1) atop the 2D representation of the face 116 in Frame 1 302(1). If, say, Frame 2 302(2) features the face 116 of the subject 114 from a different angle (e.g., a view looking directly at the front of the face 116), similar alignment 300 operations can be performed to align the instance of the 3D model 202(1) with the 2D representation of the face 116 in Frame 2 302(2), except by orienting the instance of the 3D model 202(1) in a head-on view to match the 2D representation of the face 116. This may be repeated for any number of N frames 302 of the unaltered video content 112. It is to be appreciated that the alignment 300 of the 3D model 202 can be done for all frames 302 of the unaltered video content 112, or for a select subset, but not all, of the frames 302, depending on what is desired for the altered video content 106.

In some examples, a face detector may be used to detect orientations, sizes, and/or positions of the subject's 114 face 116 in the frames 302 of the unaltered video content 112 (the original footage) to generate face detection data. This face detection data may then be used to align 300 the 3D model 202 with the 2D representations of the face 116 in one or more frames 302 of the unaltered video content 112, as shown in FIG. 3.

After aligning the 3D model 202 with the 2D representations of the face 116 of the subject 114 depicted in the frames 302 of the unaltered video content 112, one or more aligned instances of the 3D model may be obtained. These aligned instances may have respective facial expressions (e.g., mouth expressions) that are based at least in part on the animating of the 3D model 200, as described above with reference to FIG. 2. Accordingly, the aligned instances of the 3D model may look similar to the face 116 of the subject 114 in the unaltered video content 112 (the original footage), except that the aligned instances of the 3D model may have facial expressions (e.g., mouth expressions) that are different than the facial expressions of the subject 114 in the original footage. For example, the facial expressions of the aligned instances of the 3D model may correspond to the mouth-generated sound in the audio data 110, rather than the facial expressions of the subject 114 in the original footage.

As mentioned above, the techniques and systems described herein may utilize a trained machine learning model(s) to generate synthetic faces corresponding to the aligned instances of the 3D model. Accordingly, an additional operation that may be performed in order to achieve a hyperreal synthetic face is to train a machine learning model(s) to generate synthetic faces of the subject 114 featured in the unaltered video content 112 based at least in part on the aligned instances of the 3D model to obtain a trained machine learning model(s). In other words, the training of the machine learning model(s), as described herein, may be performed as part of the 3D mouth manipulation pipeline 104 depicted in FIG. 1.

Machine learning generally involves processing a set of examples (called "training data") in order to train a machine learning model(s) (sometimes referred to herein as an "AI model(s)"). A machine learning model(s), once trained, is a learned mechanism that can receive new data as input and estimate or predict a result as output. In particular, the trained machine learning model(s) used herein may be configured to generate images: namely, images of synthetic faces that are used to alter video content, such as by swapping a real face 116 with an AI-generated, synthetic face 102. In some examples, a trained machine learning model(s) used to generate synthetic faces may be a neural network(s). In some examples, an autoencoder(s), and/or a generative model(s), such as a generative adversarial network (GAN), is used herein as a trained machine learning model(s) for generating synthetic faces. In some examples, the trained machine learning model(s) described herein represents a single model or an ensemble of base-level machine learning models. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

A training dataset that is used to train the machine learning model(s) may include various types of data. In general, training data for machine learning can include two components: features and labels. However, the training dataset used to train the machine learning model(s) described herein may be unlabeled, in some embodiments. Accordingly, the machine learning model(s) described herein may be trainable using any suitable learning technique, such as supervised learning, unsupervised learning, semi-supervised learning, reinforcement learning, and so on. The features of the training data can be represented by a set of features, such as in the form of an n-dimensional feature vector of quantifiable information about an attribute of the training data. As part of the training process, weights may be set for machine learning. These weights may apply to a set of features included in the training dataset. In some examples, the weights that are set during the training process may apply to parameters that are internal to the machine learning model(s) (e.g., weights for neurons in a hidden-layer of a neural network). The weights can indicate the influence that any given feature or parameter has on the output of the trained machine learning model(s).

In the context of the present disclosure, the machine learning model(s) may be trained based at least in part on the aligned instances of the 3D model described above with reference to FIG. 3. For example, the training dataset may include the aligned instances of the 3D model, as well as an image dataset of the subject 114 featured in the unaltered video content 112. In some examples, the training dataset includes a video recording of a face of a person making the mouth-generated sound (e.g., the spoken utterance 120) included in the input audio data 110. In some examples, the training dataset includes the unaltered video content 112, and the machine learning model(s) is trained against the aligned instances of the 3D model that are aligned with the 2D footage of the unaltered video content 112. In other words, the machine learning model(s) may learn to swap the aligned instances of the 3D model with a hyperreal synthetic face of the subject 114. The trained machine learning model(s), once trained, can be used to generate synthetic faces of the subject 114, which correspond to the aligned instances of the 3D model. However, in order to improve the quality of the synthetic faces generated by the trained machine learning model(s), latent space manipulation and neural animation 100 may be utilized.

Figure 4:
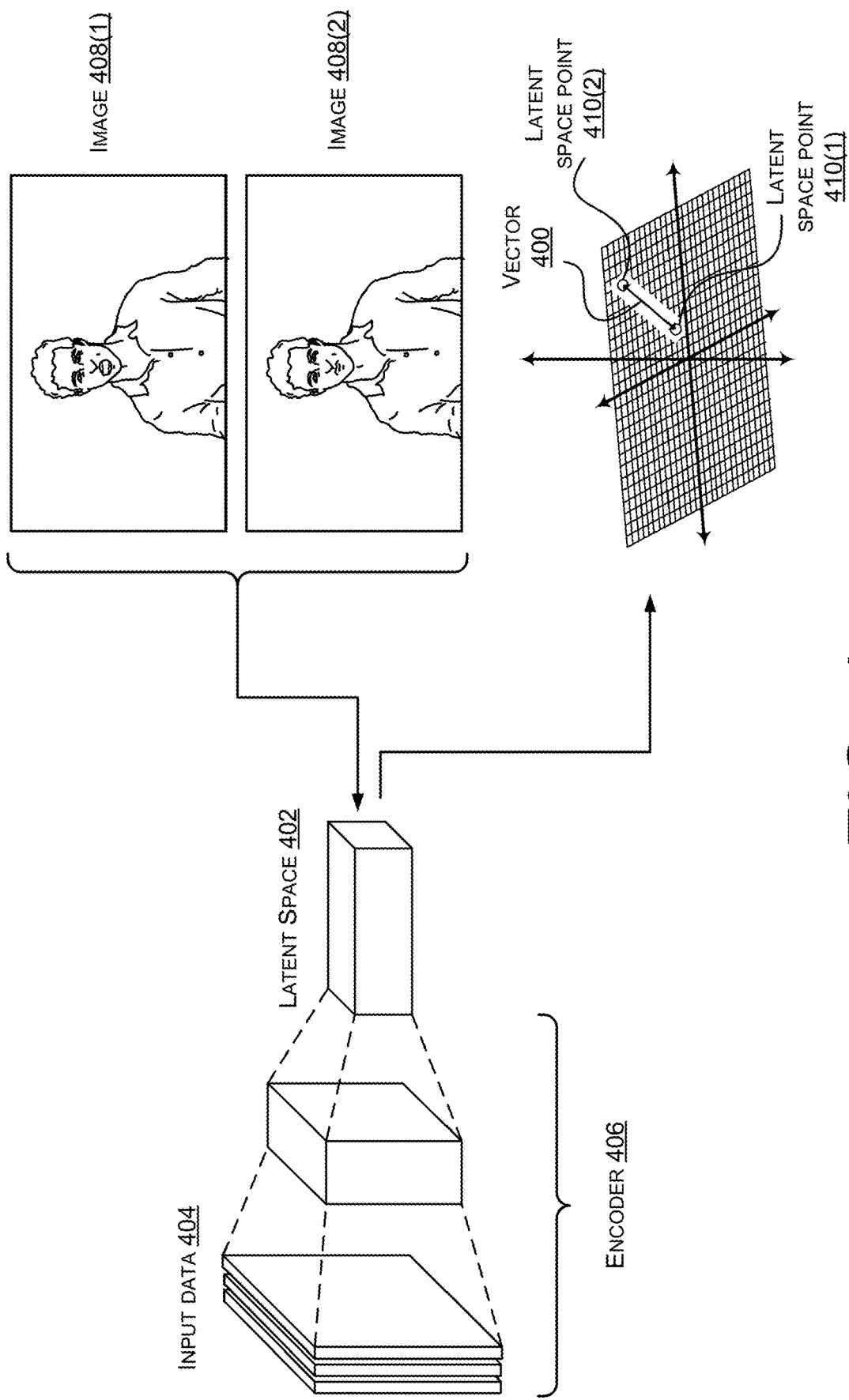
FIG. 4 is a diagram illustrating an example technique for determining a neural animation vector for use in latent space manipulation as part of a process for generating hyperreal synthetic faces.
Figure 5:
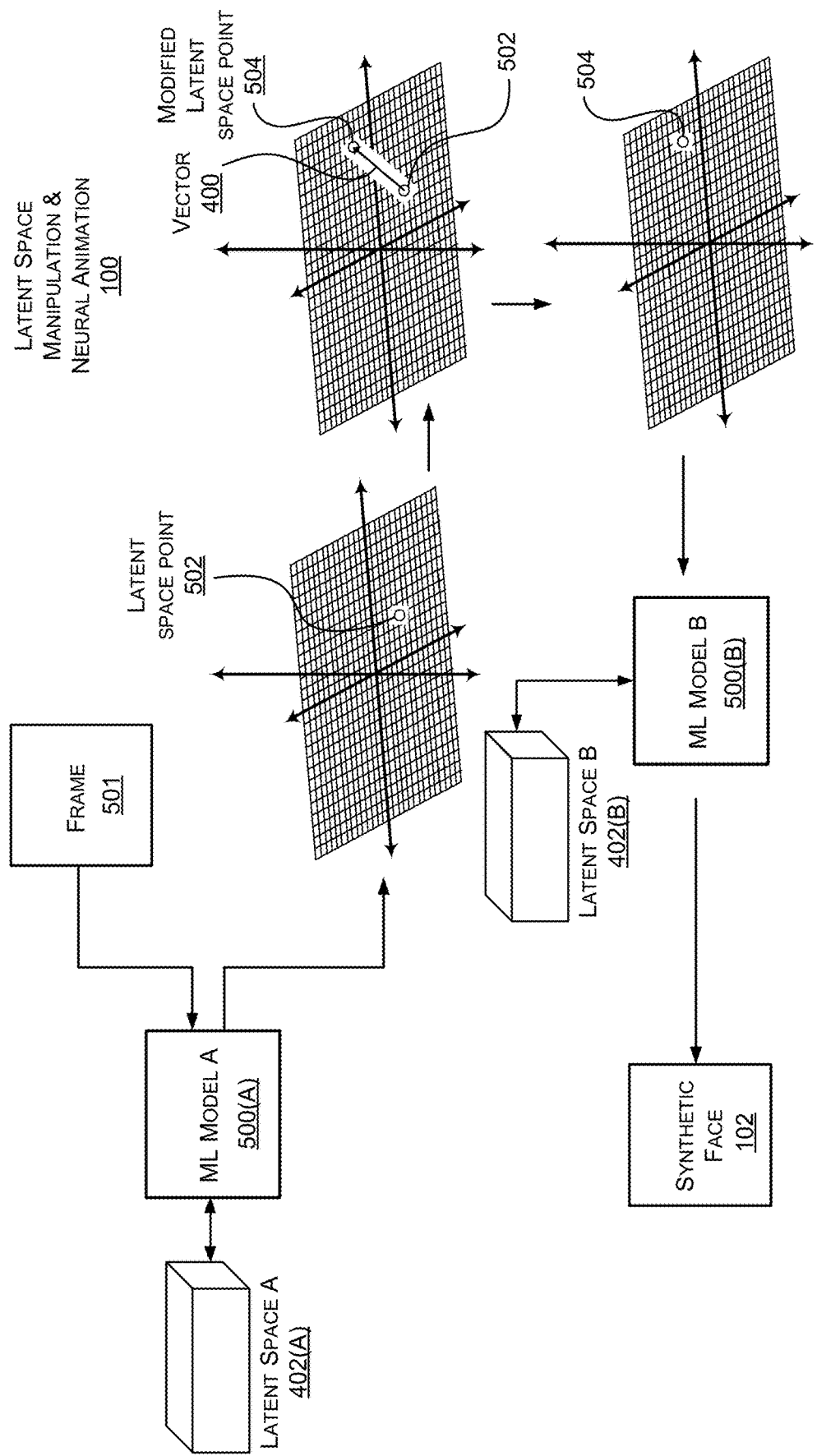
FIG. 5 is a diagram illustrating an example technique for performing latent space manipulation and neural animation as part of a process for generating hyperreal synthetic faces.

With reference to FIGS. 4 and 5, an example technique for determining a neural animation vector 400 and using the vector 400 for latent space manipulation and neural animation 100 is illustrated. As mentioned, the latent space manipulation and neural animation 100 technique depicted in FIGS. 4 and 5 may be performed as part of the 3D mouth manipulation pipeline 104 depicted in FIG. 1. For example, latent space manipulation and neural animation 100 may be used to improve the quality of the synthetic faces that are generated using the trained machine learning model(s), such as by generating the synthetic faces with enhanced facial expressions (e.g., mouth expressions) that are more natural-looking than without using the latent space manipulation and neural animation 100.

In FIG. 4, the latent space 402 is a representation of the compressed data stored by the machine learning model(s) as the model(s) learns the features of the training dataset. The latent space 402 may, therefore, represent the features of the training data. In other words, the machine learning model(s) learns the features of the training dataset and simplifies the representation of the training dataset as the latent space 402. In some examples, more complex forms of raw input data 404, such as images, video frames, or the like, are transformed into simpler representations that are more efficient to process, and these simpler representations are stored as points in the latent space 402. In the example of FIG. 4, the input data 404 may represent images and/or videos of faces used as a training dataset. In some examples, the training dataset includes images and/or videos of faces with different facial expressions, such as when the faces are making mouth-generated sounds (e.g., speaking spoken utterances). As the machine learning model(s) learns from the input data 404, the model(s) stores the relevant features of the input data 404 in a compressed representation (e.g., using the encoder 406, in an autoencoder implementation). This compressed form of the data features stored in the latent space 402 is usable, such as by a decoder of the trained machine learning model(s), to accurately reconstruct the latent space representation into a 2D image (e.g., an image of a synthetic face 102.

The dimensions of the latent space 402 can vary. That is, the latent space 402 may store data points as n-dimensional feature vectors, where "n" can be any suitable integer. For the sake of visualizing the latent space 402, examples described herein depict the latent space 402 as a 3D space, and each latent space point is definable with three numbers that can be graphed on a 3D coordinate plane (e.g., a latent space point defined by an X value, a Y value, and a Z value). However, it is to be appreciated that a latent space 402 of a machine learning model(s) can be, and is oftentimes, a higher-dimensional space, seeing as how more than three dimensions are often needed to store the feature data in the latent space 402. Within the latent space 402, the difference between two latent space points may be indicative of the similarity between the two latent space points. That is, similar latent space points tend to be closer to each other within the latent space 402, and dissimilar latent space points tend to be farther from each other within the latent space 402.

In the example of FIG. 4, two images 408 (e.g., a first image 408(1) and a second image 408(2)) of the face of the subject 114 featured in the unaltered video content 112 are provided to the trained machine learning model(s) whose latent space 402 is represented in FIG. 4. In some examples, providing the images 408 to the trained machine learning model(s), as shown in FIG. 4, is referred to as "projecting" the images 408 against the trained machine learning model(s). Projecting the images 408 against the model(s) may serve as a request for the model(s) to output the latent space points that correspond to the respective images 408(1) and 408(2). Accordingly, the two images 408 may depict the subject 114 with distinguishing facial expressions (e.g., mouth expressions) to determine the distance between the two corresponding latent space points within the latent space 402. In an example, the first image 408(1) may depict the subject 114 with his/her mouth open, and the second image 408(2) may depict the subject 114 with his/her mouth closed. This is merely an example where latent space manipulation and neural animation 100 might be used to make the mouth of the synthetic face 102 more open or more closed, as the case may be. If, on the other hand, latent space manipulation and neural animation 100 is being used to make the eyes more expressive, for example, the two images 408 might include a first image of the subject 114 with his/her eyes wide open and a second image of the subject 114 with his/her eyes shut. As yet another example, the two images 408 might include a first image of the subject 114 with a smiling face and a second image of the subject 114 with a sad face. These are merely examples of images with distinguishing facial expressions that can be used to determine a neural animation vector 400.

In some examples, the images 408 are selected from the training dataset that was used for the training of the machine learning model(s) whose latent space 402 is represented in FIG. 4. That is, the trained machine learning model(s) with the latent space 402 may have already "seen" (or learned from) the images 408. It is to be appreciated, however, that the images 408 may be "new" to the trained machine learning model(s) with the latent space 402.

In some examples, a utility (e.g., one or more user interfaces) is exposed to an AI artist to select the images 408 and/or provide the images 408 to the trained machine learning model(s). In this manner, the AI artist can use the exposed utility to drive the neural animation layer by "puppeteering" the latent space 402 and achieve a desired manipulation thereof.

As shown in FIG. 4, in response to providing the two images 408 to the trained machine learning model(s), two latent space points 410 (e.g., a first latent space point 410(1) and a second latent space point 410(2)) that correspond to the two input images 408 may be received from the model(s). A neural animation vector 400 may then be determined based at least in part on a difference between the two latent space points 410(1) and 410(2). Depending on the dimensionality of the latent space 402, this "difference" computation may vary. The difference may be visualized in a 2D or 3D latent space 402 as the length of a segment connecting the two latent space points 410(1) and 410(2). In some examples, this difference corresponds to the magnitude of the vector 400. The vector 400 can also have one or more directions, such as a first direction from the first point 410(1) as the origin to the second point 410(2) as the destination, and/or a second direction from the second point 410(2) as the origin to the first point 410(1) as the destination. The direction(s) of the vector 400 may be indicative of how to manipulate the latent space 402 to modify one point 410 in a direction towards (e.g., at least partway to) the other point 410.

FIG. 5 is a diagram illustrating an example technique for performing latent space manipulation and neural animation 100. As mentioned, the latent space manipulation and neural animation 100 technique depicted in FIG. 5 may be performed as part of the 3D mouth manipulation pipeline 104 depicted in FIG. 1. There are two trained machine learning models 500 depicted in FIG. 5, a first trained machine learning model 500(A) ("ML model A") and a second trained machine learning model 500(B) ("ML model B"). The second model 500(B) may have been trained to generate synthetic faces of the subject 114 (e.g., the subject 114 featured in the unaltered video content 112) based at least in part on the aligned instances of the 3D model described above with reference to FIG. 3. The latent space 402(B) of this second model 500(B) may be synchronized with the latent space 402(A) of the first model 500(A). As such, the latent space 402(A) is associated with the second model 500(B), despite being the latent space 402(A) of a different trained machine learning model(s); namely the first model 500(A).

In FIG. 5, a frame 501 is provided to the first trained machine learning model 500(A). In an example, the frame 501 may be provided as input to a decoder of the first model 500(A) in an autoencoder implementation. The frame 501 may depict a face having a particular facial expression (e.g., a mouth expression, such as an open mouth, a closed mouth, a smiling mouth, etc.). In response to providing the frame 501 to the first model 500(A), a latent space point 502 is received from the first model 500(A). The received latent space point 502 may be a point 502 within the latent space 402(A) of the first model 500(A) that corresponds to the face depicted in the frame 501. In other words, the latent space point 502 may be an n-dimensional feature vector corresponding to the first model's 500(A) compressed representation of the face with the facial expression depicted in the frame 501.

The vector 400 obtained in FIG. 4 may then be applied to the point 502 to obtain a modified latent space point 504. In some examples, applying the vector 400 to the latent space point 502 includes moving the point 502 in the direction of the vector 400 by a distance corresponding to the magnitude of the vector 400 to another point within the latent space 402(A) that corresponds to the modified latent space point 504. In some examples, the point 502 may be moved in the direction of the vector 400 by a distance corresponding to a fraction of the magnitude, such as half of the magnitude, three quarters of the magnitude, or the like. As mentioned above, in some examples, a utility (e.g., one or more user interfaces) is exposed to an AI artist, which may allow the AI artist to control how the vector 400 is applied to the point 502 in the various ways described herein, thereby allowing the AI artist to drive the neural animation layer by "puppeteering" the latent space and achieve a desired manipulation thereof.

In some examples, there may be multiple neural animation vectors to choose from, and one of the multiple latent space vectors 400 may be selected and applied to the latent space point 502 to obtain the modified latent space point 504. The selection of the vector 400 among multiple available neural animation vectors may be based on the input frame 501 and/or the target synthetic face 102 that is to be generated. For example, a first neural animation vector 400 might be selected for one frame 501 in order to make a mouth of the synthetic face 102 more open or more closed, while a second neural animation vector 400 might be selected for another frame 501 in order to make a smile of the synthetic face 102 more expressive (e.g., a bigger smile) or less expressive (e.g., a smaller smile). These are merely examples of how a neural animation vector 400 might be used.

The modified latent space point 504 may then be provided to the second trained machine learning model 500(B), as shown in FIG. 5. In an example, the modified latent space point 504 may be provided as input to a decoder of the second model 500(B) in an autoencoder implementation. Based at least in part on the modified latent space point 504, the second model 500(B) may generate a synthetic face 102 of the subject 114 that is to be included in the altered video content 106. In some examples, the synthetic face 102 generated by the second model 500(B) corresponds to an aligned instance of the 3D model, as described above with reference to FIG. 3. In other words, the synthetic face 102 generated by the second model 500(B) may be used to swap out the aligned instance of the 3D model for a particular frame 302 of the unaltered video content 112. In this sense, FIG. 5 depicts a single input frame 501 and a single synthetic face 102 that may be generated based on the single input frame 501, but the technique illustrated in FIG. 5 may be repeated for multiple frames to generated multiple instances of the synthetic face 102 that correspond to the aligned instances of the 3D model, which allows for altering video content comprised of multiple frames 302. In some examples, a single latent space vector 400 may be applied as a static offset over an entire video, or on a frame-by-frame basis (e.g., the vector 400 may be applied for latent space manipulation and neural animation 100 on select key frames 302 within the unaltered video content 112). In other words, latent space manipulation and neural animation 100 can be used to improve the quality of the synthetic faces 102 generated by the trained machine learning model(s) 500 for certain portions of the video, or across the entire video, as the case may be. As a result of implementing the latent space manipulation and neural animation 100 technique depicted in FIG. 5, the synthetic faces 102 generated by the trained machine learning model(s) 500 may exhibit enhanced facial expressions (e.g., mouth expressions) that are more natural-looking than without the use of latent space manipulation and neural animation 100.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
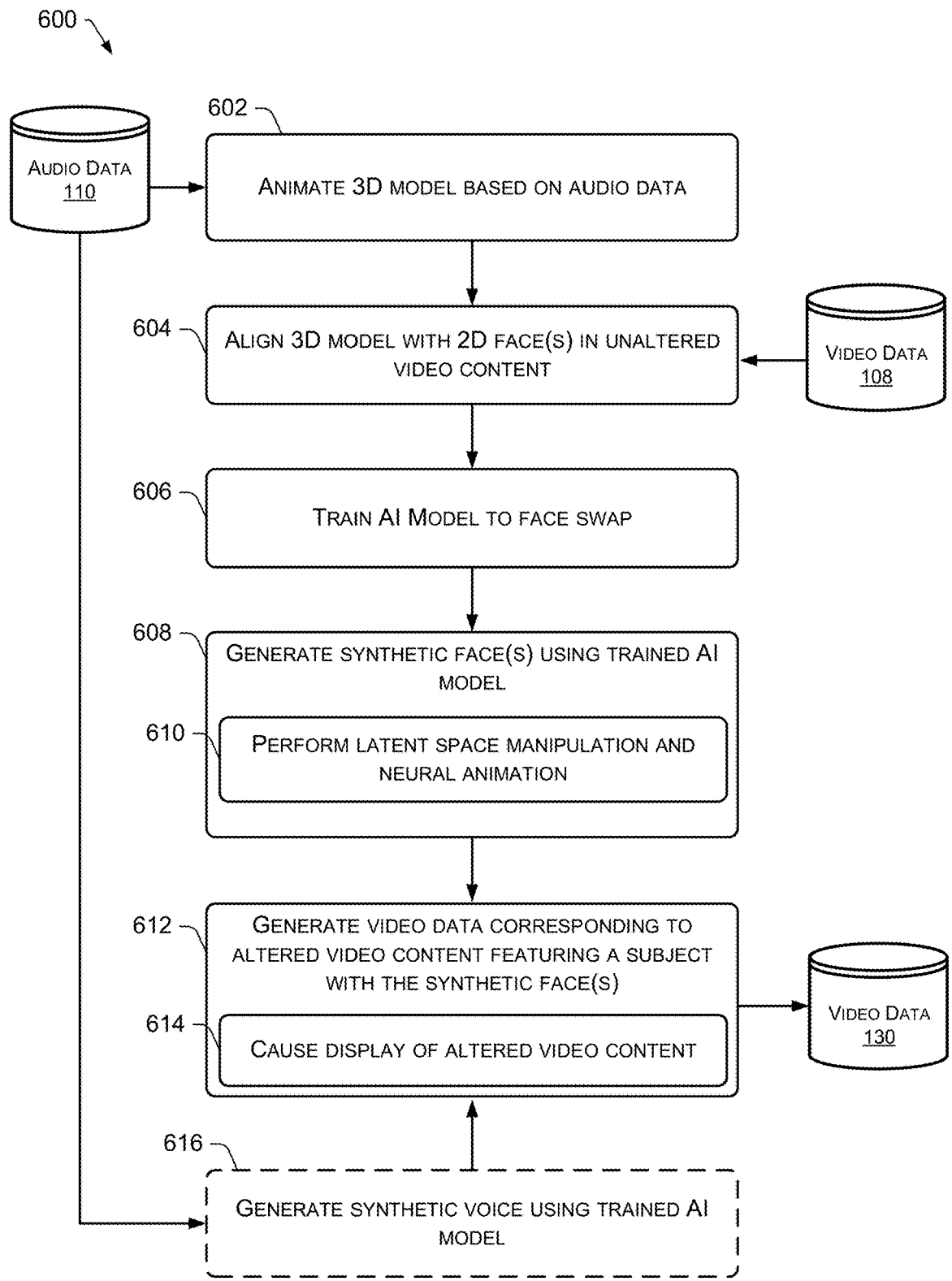
FIG. 6 is a flow diagram of an example process for using latent space manipulation and neural animation to generate hyperreal synthetic faces in altered video content.

FIG. 6 is a flow diagram of an example process 600 for using latent space manipulation and neural animation 100 to generate hyperreal synthetic faces 102 in altered video content 106. The process 600 may be implemented by one or more processors (e.g., a processor(s) of a computing system and/or computing device, such as the computing device 900 of FIG. 9). For discussion purposes, the process 600 is described with reference to the previous figures.

At 602, a processor(s) may animate a 3D model 200 of a face 116 based at least in part on audio data 110 corresponding to a mouth-generated sound. In some examples, the mouth-generated sound is a first spoken utterance, such as a first spoken utterance in a first spoken language (e.g., French). With reference to the example of FIG. 1, the audio data 110 may correspond to the French language phrase "Bonjour, je m'appelle Chris." In some examples, the face 116 on which the 3D model 200 is based is the face 116 of a subject 114 featured in unaltered video content 112. In some examples, this subject 114 is a person. In some examples, the unaltered video content 112 features the subject 114 (e.g., the person) with the face 116 making a second mouth-generated sound, such as a second spoken utterance (e.g., a second spoken utterance in a second spoken language different than the first spoken language, such as the English language phrase "Hi, my name is Chris." The animating of the 3D model 200 at block 602 may include any of the operations described above with reference to FIG. 2.

At 604, the processor(s) may align 300 the 3D model with a 2D representation of the face 116 depicted in a frame 302 of unaltered video content 112 to obtain an aligned 3D model having a facial expression (e.g., mouth expression) based at least in part on the animating performed at block 602. Accordingly, FIG. 6 shows the video data 108 corresponding to the unaltered video content 112 being accessed to perform the alignment 300 at block 604. In some examples, the alignment at block 604 is performed across multiple frames 302(1)-(N) of the unaltered video content 112. Accordingly, the 3D model may be aligned with multiple 2D representations of the face 116 depicted in the frames 302(1)-(N) of the unaltered video content 112 to obtain multiple aligned instances of the 3D model for the multiple frames 302(1)-(N) of the unaltered video content 112. These aligned instances of the 3D model may have respective facial expressions (e.g., mouth expressions) based at least in part on the animating performed at block 602. The aligning 300 performed at block 604 may include any of the operations described above with reference to FIG. 3.

At 606, the processor(s) may train a machine learning model(s) (or AI model(s)) to generate a synthetic face(s) of the subject 114 (e.g., person) featured in the unaltered video content 112 based at least in part on the aligned 3D model (e.g., based on the aligned instances of the 3D model). A trained machine learning model(s) 500 is obtained as a result of the training at block 606. A training dataset that is used to train the machine learning model(s) 500 may include various types of data, as described herein. For example, the training dataset may include the aligned instances of the 3D model, an image dataset of the subject 114 featured in the unaltered video content 112, a video recording(s) of a face of a person making the mouth-generated sound(s) (e.g., the spoken utterance 120) included in the input audio data 110, and/or the unaltered video content 112 itself. In some examples, at block 606, the machine learning model(s) 500 is trained against the aligned instances of the 3D model that are aligned with the 2D footage of the unaltered video content 112. In other words, the machine learning model(s) may learn to face swap (e.g., to swap the aligned instances of the 3D model with a hyperreal synthetic face of the subject 114).

At 608, the processor(s) may use the trained machine learning model(s) 500 to generate the synthetic face 102 of the subject 114 (e.g., person) featured in the unaltered video content 112. The synthetic face 102 may correspond to the aligned 3D model. In other words, the synthetic face 102 may be in the same or similar orientation, the same or similar size, and/or at the same position in the frame as the aligned the 3D model based on how the model(s) 500 was trained at block 606. If face swapping is performed across multiple frames, the trained machine learning model(s) 500 may be used to generate multiple instances of the synthetic face 102 that correspond to the multiple aligned instances of the 3D model. As indicated by sub-block 610, the generation of the synthetic face(s) 102 at block 608 may involve latent space manipulation and neural animation 100 to improve the quality of the synthetic face(s) 102.

For example, at 610, the processor(s) may perform latent space manipulation and neural animation 100 by applying a vector 400 to at least one point 502 within a latent space 402(A) associated with the trained machine learning model(s) 500 to obtain a modified latent space point 504, and the generation of the synthetic face(s) 102 at block 608 may be based at least in part on this modified latent space point 504. Again, if face swapping is performed across multiple frames, the processor(s) may, on a frame-by-frame basis, apply the vector 400 (or possibly multiple different neural animation vectors) to multiple points 502 within the latent space 402(A) associated with the trained machine learning model(s) 500 to obtain multiple modified latent space points 504 across multiple frames, and the generation of multiple instances of the synthetic face 102 at block 608 may be based at least in part on these modified latent space points 504. In other words, the trained machine learning model(s) 500 may generate instances of the synthetic face 102 over multiple frames, and may perform latent space manipulation and neural animation 100 to make the instances of the synthetic face 102 more natural-looking. As mentioned above, this can be done for individual frames as desired, or as a static offset across the entire set of frames that are to be used for the altered video content 106. The generation of the synthetic face(s) 102 using latent space manipulation and neural animation 100 at blocks 608 and 610 may include any of the operations described above with reference to FIGS. 4 and 5. The result after block 610 is a more precise and accurate synthetic face 102 without requiring the subject 114 in the original footage to be over-expressive and without having to devise new strategies for re-training the machine learning model(s) 500 to achieve a desired result.

At 612, the processor(s) may generate, based at least in part on the unaltered video content 112, video data 130 corresponding to altered video content 106 featuring the subject 114 (e.g., person) with the synthetic face 102 making the mouth-generated sound (e.g., speaking the first spoken utterance). In some examples, the generating of the video data 130 at block 612 includes overlaying the instances of the synthetic face 102 generated at block 608 on the 2D representations of the face 116 depicted in the frames of the unaltered video content 112. In some examples, at block 612 or afterwards, postproduction video editing may be performed to enhance the altered video content 106 in terms of color grading, adding highlights, skin texture, or the like, to make the altered video content 106 look as realistic as possible.

At 614, the processor(s) may cause the altered video content 106 to be displayed on a display. For example, the video data 130 corresponding to the altered video content 106 may be stored in a datastore and accessed at any point in time for display on a computing device. For example, a user computing device may request access to the video data 130, and the video data 130 may be processed on the user computing device to display the altered video content 106 on a display of the user computing device. Such a user computing device may be any suitable type of device including a mobile phone, a tablet computer, a personal computer (PC), a head-mounted display (HMD), such as a virtual reality (VR) headset or an augmented reality (AR) headset, a game console and associated display, or any suitable type of user computing device with a display. In some examples, the video data 130 is made accessible over a network, such as a wide area network (e.g., the Internet). The altered video content 106 that is displayed may feature a synthetic face(s) 102 that hyperreal due to the enhanced facial expressions (e.g., mouth expressions) enabled through the use of latent space manipulation and neural animation 100 in combination with the remaining operations of the process 600 described herein.

At 616, the processor(s) may use a different trained machine learning model(s) to generate a synthetic voice making the mouth-generated sound (e.g., speaking the first spoken utterance) included in the input audio data 110. This different trained machine learning model(s) may be trained on audio data representing the voice of the subject 114 and/or audio data representing the voice of the person 122 who recorded the voiceover (e.g., the spoken utterance 120) for the audio data 110 to learn how to swap the voice of the person 122 for the voice of the subject 114. Accordingly, the altered video content 106 may further feature the synthetic voice making the mouth-generated sound (e.g., speaking the first spoken utterance). Imagine, for instance, that the synthetic voice is generated to sound very similar to the subject 114 who is featured in the unaltered video content 112. In this way, the altered video content 106 may also sound convincing, in addition to looking convincing. The dashed lines of block 616 indicate that generating the synthetic voice is purely optional in the process 600, if synthetic audio is desired in addition to the synthetic video (e.g., synthetic face(s) 102).

Figure 7:
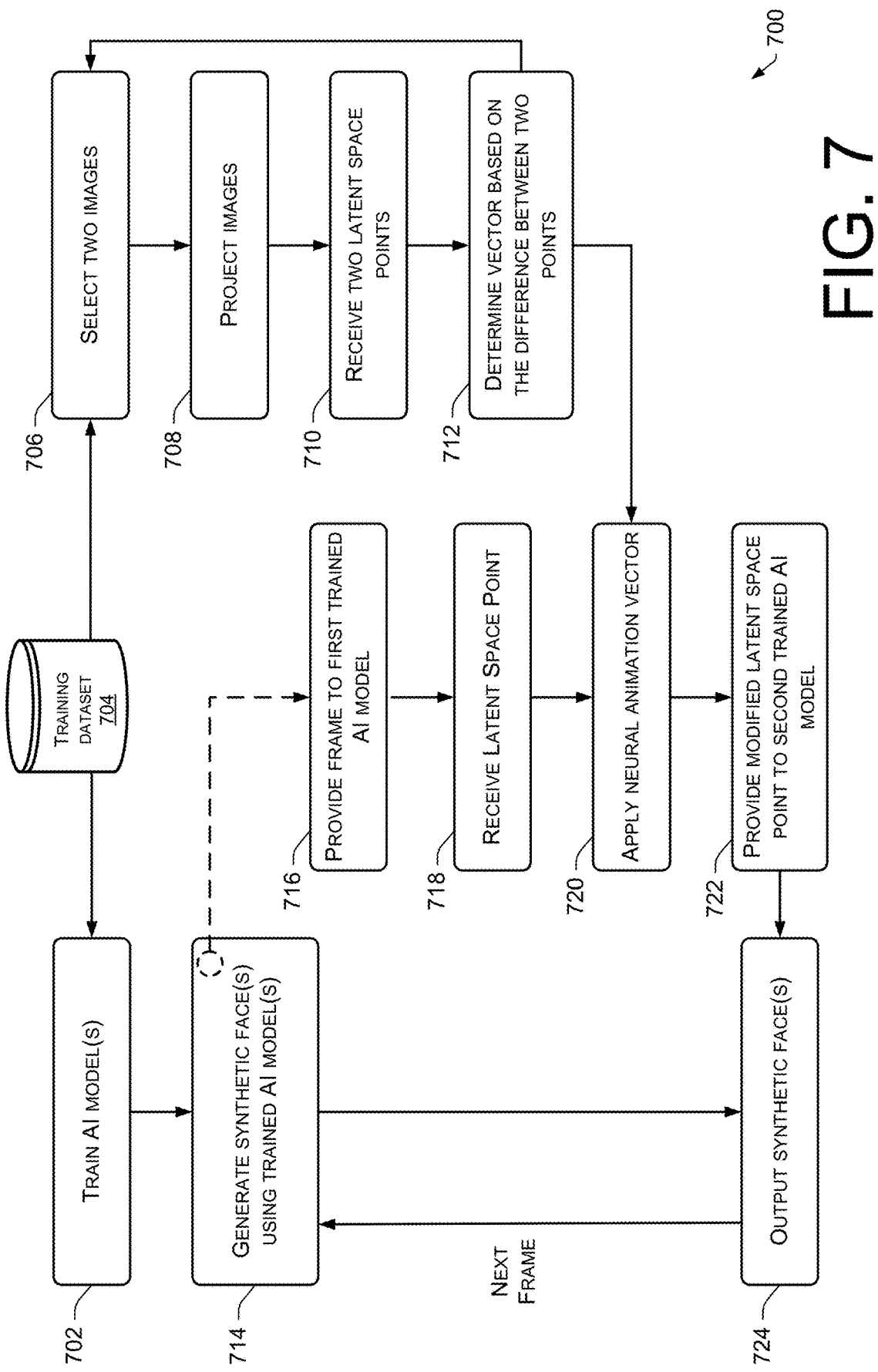
FIG. 7 is a flow diagram of an example process for performing latent space manipulation and neural animation as part of a process for generating hyperreal synthetic faces.

FIG. 7 is a flow diagram of an example process 700 for performing latent space manipulation and neural animation 100 as part of a process for generating hyperreal synthetic faces. The process 700 may be implemented by one or more processors (e.g., a processor(s) of a computing system and/or computing device, such as the computing device 900 of FIG. 9). For discussion purposes, the process 700 is described with reference to the previous figures. Moreover, it is to be appreciated that the process 700 may represent a sub-process of blocks 608 and/or 610 of the process 600.

At 702, a processor(s) may train a machine learning model(s) (or AI model(s)) to generate a synthetic face(s) of the subject 114 (e.g., person) featured in unaltered video content 112 to obtain a trained machine learning model(s) 500. In some examples, multiple machine learning models, such as the first machine learning model 500(A) and the second machine learning model 500(B) depicted in FIG. 5, are trained at block 702. In some examples, the training performed at block 702 involves training at least one of these models, such as the second model 500(B). FIG. 7 shows a training dataset 704 used for the training at block 702. The training dataset 704 may include various types of data, as described herein. For example, the training dataset 704 may include the aligned instances of the 3D model of the subject 114, an image dataset of the subject 114 featured in the unaltered video content 112, a video recording(s) of a face of a person making the mouth-generated sound(s) (e.g., the spoken utterance 120 included in the input audio data 110, and/or the unaltered video content 112 itself. In some examples, at block 702, the machine learning model(s) 500 is trained against the aligned instances of the 3D model that are aligned with the 2D footage of the unaltered video content 112, as described herein. In other words, the machine learning model(s) may learn to face swap (e.g., to swap the aligned instances of the 3D model with a hyperreal synthetic face of the subject 114).

At 706, the processor(s) may select two images 408 of the face 116 of the subject 114 (e.g., person). As shown in FIG. 7, these two images 408 may be selected from the training dataset 704 that was used for the training of the machine learning model(s) at block 702. Alternatively, the two images 408 may be selected from a dataset that was not used to for the training at block 702. Accordingly, it is to be appreciated that the trained machine learning model(s) 500 may or may not have "seen" (e.g., learned from) the two images 408 selected at block 706. The selecting performed at block 706 may include any of the operations described above with reference to FIG. 4. In an example, the two images 408 may include a first image 408(1) of the subject 114 with his/her mouth open, and a second image 408(2) of the subject 114 with his/her mouth closed, but any two images 408 contrasting any suitable type of facial expressions may be selected at block 706.

At 708, the processor(s) may "project" the images 408 against the trained machine learning model(s) 500, which is to say that the processor(s) may provide the two images 408 of the face 116 of the subject 114 to the trained machine learning model(s) 500 for purposes of determining the points in latent space 402 that correspond to the two images 408. The projecting performed at block 708 may include any of the operations described above with reference to FIG. 4.

At 710, the processor(s) may receive, from the trained machine learning model(s) 500, two latent space points 410 (e.g., a first point 410(1) and a second point 410(2)) that correspond to the two images 408 (e.g., the first image 408(1) and the second image 408(2)). The receiving performed at block 710 may include any of the operations described above with reference to FIG. 4.

At 712, the processor(s) may determine a neural animation vector 400 based at least in part on a difference between the two latent space points 410(1) and 410(2). The determining of the vector 400 performed at block 712 may include any of the operations described above with reference to FIG. 4. Furthermore, as indicated by the return arrow from block 712 to block 706, blocks 706 to 712 may iterate any number of times by selecting a different pair of images 408 to potentially obtain multiple different neural animation vectors 400. That is, a first vector 400 associated with "mouth open" and "mouth closed" images 408 may be determined, a second vector 400 associated with "mouth smiling" and "mouth not smiling" images 408 may be determined, and so on and so forth to obtain any suitable number of different neural animation vectors 400.

At 714, the processor(s) may use the trained machine learning model(s) 500 to generate the synthetic face 102 of the subject 114 (e.g., person) featured in the unaltered video content 112 for an individual frame. Blocks 716 to 722 represent operations that may be performed to generate the synthetic face 102 at block 714.

At 716, the processor(s) may provide a frame 501 to a first trained machine learning model 500(A), such as to a decoder of the first model 500(A) in an autoencoder implementation. The frame 501 may depict a face having a particular facial expression (e.g., a mouth expression, such as an open mouth, a closed mouth, a smiling mouth, etc.). In some examples, the face depicted in the frame 501 is a face that is different than the face 116 of the subject 114 featured in the unaltered video content 112. For example, the face depicted in the frame 501 may be a face of another subject (e.g., person 122) who is making the mouth-generated sound (e.g., speaking the spoken utterance 120) included in the input audio data 110. The providing performed at block 716 may include any of the operations described above with reference to FIG. 5.

At 718, in response to providing the frame 501 to the first model 500(A) at block 716, the processor(s) may receive a latent space point 502 from the first model 500(A). The received latent space point 502 may be a point 502 within the latent space 402(A) of the first model 500(A) that corresponds to the face depicted in the frame 501. In other words, the latent space point 502 may be an n-dimensional feature vector corresponding to the first model's 500(A) compressed representation of the face with the facial expression depicted in the frame 501. The receiving performed at block 718 may include any of the operations described above with reference to FIG. 5.

At 720, the processor(s) may apply a neural animation vector 400 determined at block 712 to the point 502 received at block 718 to obtain a modified latent space point 504. In some examples, applying the vector 400 to the latent space point 502 at block 720 includes moving the point 502 in the direction of the vector 400 by a distance corresponding to the magnitude of the vector 400 to another point within the latent space 402(A) that corresponds to the modified latent space point 504. In some examples, the point 502 may be moved in the direction of the vector 400 by a distance corresponding to a fraction of the magnitude, such as half of the magnitude, three quarters of the magnitude, or the like. In some examples, the distance that the point 502 is moved is dynamically determined. This may be based at least in part on a user manipulating a slider on a user interface to indicate an amount by which the facial expression of the subject 114 is to be enhance or diminished. For example, an AI artist may manipulate the slider via an exposed utility, as described above, allowing the AI artist to "puppeteer" the latent space 402(A) and achieve a desired manipulation thereof. In some examples, the vector 400 that is applied may be selected from multiple available neural animation vectors. This vector selection may be based on user input and/or the input frame 501. The applying performed at block 720 may include any of the operations described above with reference to FIG. 5.

At 722, the processor(s) may provide the modified latent space point 504 to a second trained machine learning model 500(B). In an example, at block 722, the modified latent space point 504 may be provided as input to a decoder of the second model 500(B) in an autoencoder implementation. The providing performed at block 722 may include any of the operations described above with reference to FIG. 5.

At 724, the second model 500(B) may generate (e.g., output) a synthetic face 102 of the subject 114 based at least in part on the modified latent space point 504. Ultimately, this synthetic face 102 may be included in the altered video content 106, as described herein. In other words, the synthetic face 102 generated (e.g., outputted) by the second model 500(B) at block 724 may be used to swap out the aligned instance of the 3D model for a particular frame 302 of the unaltered video content 112. Furthermore, because the latent space 402(B) of this second model 500(B) is synchronized with the latent space 402(A) of the first model 500(A) (e.g., because the models 500(A) and 500(B) may be trained against each other at block 702), the synthetic face 102 corresponds to the facial expression depicted in the frame 501 provided to the first model 500(A) at block 716, except that the facial expression is modified (e.g., enhanced or diminished) based on the latent space manipulation and neural animation 100 performed (e.g., at block 720). This causes the synthetic face 102 generated (e.g., outputted) at block 724 to exhibit an enhanced facial expression (e.g., mouth expression) that is more natural-looking than without the use of latent space manipulation and neural animation 100. For instance, mouth movements can be exaggerated or diminished, a blink of an eye can be added where there was no blink in the original footage. In some ways, the latent space manipulation and neural animation 100 is a technique for fine-tuning the generation of the synthetic face 102 to modify the facial expressions as desired for a hyperreal outcome. The generating (e.g., outputting) performed at block 724 may include any of the operations described above with reference to FIG. 5. Moreover, as indicated by the return arrow ("next frame") from block 724 to block 714, blocks 714 to 724 may iterate to generate multiple instances of the synthetic face 102 of the subject 114 for multiple frames, which allows for altering video content comprised of multiple frames 302.

Figure 8:
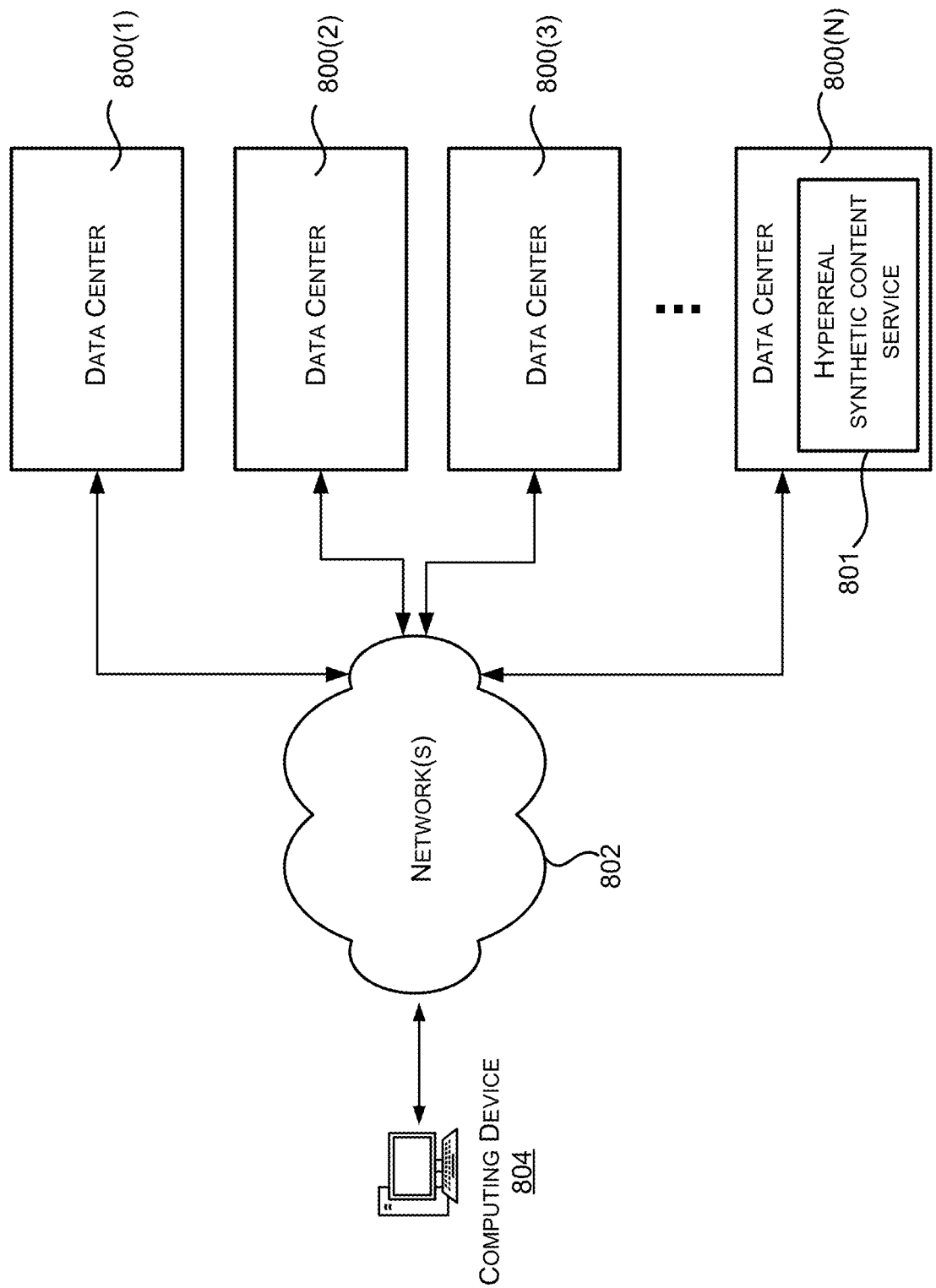
FIG. 8 is a system and network diagram that shows an illustrative operating environment that includes one or more components configured to implement aspects of the functionality described herein.

FIG. 8 is a system and network diagram that shows one illustrative operating environment for the configurations disclosed herein that includes a hyperreal synthetic content service 801 configured to perform the techniques and operations described herein. The computing resources utilized by the hyperreal synthetic content service 801 are enabled in one implementation by one or more data centers 800(1)-(N) (collectively 800). The data centers 800 are facilities utilized to house and operate computer systems and associated components. The data centers 800 typically include redundant and backup power, communications, cooling, and security systems. The data centers 800 can also be located in geographically disparate locations. In FIG. 8, the data center 800(N) is shown as implementing the hyperreal synthetic content service 801. That is, the computing resources provided by the data center(s) 800 can be utilized to implement the techniques and operations described herein. In an example, these computing resources can include data storage resources, data processing resources, such as virtual machines, networking resources, data communication resources, network services, and other types of resources. Data processing resources can be available as physical computers or virtual machines in a number of different configurations. The virtual machines can be configured to execute applications, including web servers, application servers, media servers, database servers, and/or other types of programs. Data storage resources can include file storage devices, block storage devices, and the like. The data center(s) 800 can also be configured to provide other types of computing resources not mentioned specifically herein.

Users can access the above-mentioned computing resources over a network(s) 802, which can be a wide area communication network ("WAN"), such as the Internet, an intranet or an Internet service provider ("ISP") network or a combination of such networks. For example, and without limitation, a computing device 804 operated by a user can be utilized to access the hyperreal synthetic content service 801 by way of the network(s) 802. It should be appreciated that a local-area network ("LAN"), the Internet, or any other networking topology known in the art that connects the data centers 800 to remote user can be utilized. It should also be appreciated that combinations of such networks can also be utilized.

Figure 9:
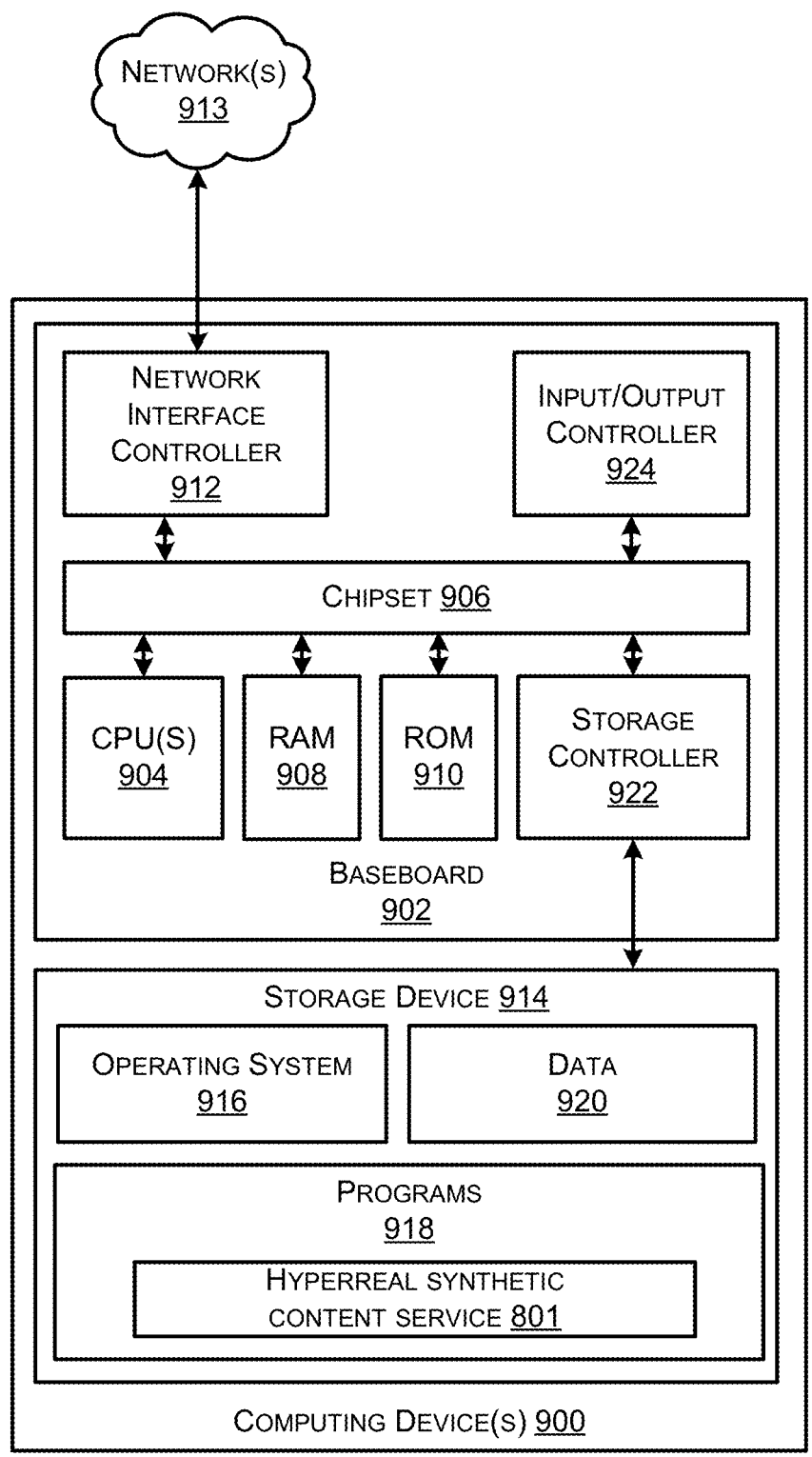
FIG. 9 is a computer architecture diagram showing an illustrative computer architecture for implementing a computing device(s) that can be utilized to implement aspects of the various technologies presented herein.

FIG. 9 shows an example computer architecture for a computing device(s) 900 capable of executing program components for implementing the functionality described above. The computer architecture shown in FIG. 9 may represent a workstation, desktop computer, laptop, tablet, network appliance, smartphone, server computer, or other computing device, and can be utilized to execute any of the software components presented herein. For example, the computing device(s) 900 may represent a server(s) of a data center 800. In another example, the computing device(s) 900 may represent a user computing device, such as the computing device 804.

The computer 900 includes a baseboard 902, which is a printed circuit board (PCB) to which a multitude of components or devices can be connected by way of a system bus or other electrical communication paths. In one illustrative configuration, one or more CPUs 904 operate in conjunction with a chipset 906. The CPUs 904 can be standard programmable processors that perform arithmetic and logical operations necessary for the operation of the computer 900, and the CPUs 904 may be generally referred to herein as a processor(s), such as the processor(s) for implementing the process 600 and/or the process 700, as described above.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may represent the "hardware bus" described above, and it can provide an interface to a random access memory ("RAM") 908, used as the main memory in the computing device(s) 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computing device(s) 900 in accordance with the configurations described herein.

The computing device(s) 900 can operate in a networked environment using logical connections to remote computing devices and computer systems through a network(s) 913, which may be the same as, or similar to, the network(s) 802. The chipset 906 can include functionality for providing network connectivity through a network interface controller (NIC) 912, such as a gigabit Ethernet adapter. The NIC 912 may be capable of connecting the computing device(s) 900 to other computing devices over the network(s) 913. It should be appreciated that multiple NICs 912 can be present in the computing device(s) 900, connecting the computer to other types of networks and remote computer systems.

The computing device(s) 900 can be connected to a mass storage device 914 that provides non-volatile storage for the computer. The mass storage device 916 can store an operating system 916, programs 918, and data 920, to carry out the techniques and operations described in greater detail herein. For example, the programs 918 may include the hyperreal synthetic content service 801 to implement the techniques and operations described herein, and the data 920 may include the various model(s) 500 and data used to train the model(s) 500, as well as the audio data and/or video data described herein, such as video data corresponding to unaltered and altered video content, as described herein. The mass storage device 914 can be connected to the computing device 900 through a storage controller 922 connected to the chipset 906. The mass storage device 914 can consist of one or more physical storage units. The storage controller 922 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device(s) 900 can store data on the mass storage device 914 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 914 is characterized as primary or secondary storage, and the like.

For example, the computing device(s) 900 can store information to the mass storage device 914 by issuing instructions through the storage controller 922 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device(s) 900 can further read information from the mass storage device 914 by detecting the physical states or characteristics of one or more particular locations within the physical storage units.

In addition to the mass storage device 914 described above, the computing device(s) 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device(s) 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

In one configuration, the mass storage device 914 or other computer-readable storage media is encoded with computer-executable instructions which, when loaded into the computing device(s) 900, transform the computer from a general-purpose computing system into a special-purpose computer capable of implementing the configurations described herein. These computer-executable instructions transform the computing device(s) 900 by specifying how the CPUs 904 transition between states, as described above. According to one configuration, the computing device(s) 900 has access to computer-readable storage media storing computer-executable instructions which, when executed by the computing device(s) 900, perform the various processes described above. The computing device(s) 900 can also include computer-readable storage media storing executable instructions for performing any of the other computer-implemented operations described herein.

The computing device(s) 900 can also include one or more input/output controllers 924 for receiving and processing input from a number of input devices, such as a keyboard, a mouse, a touchpad, a touch screen, an electronic stylus, or other type of input device. Similarly, an input/output controller 924 can provide output to a display, such as a computer monitor, a flat-panel display, a digital projector, a printer, or other type of output device.

Figure 10:
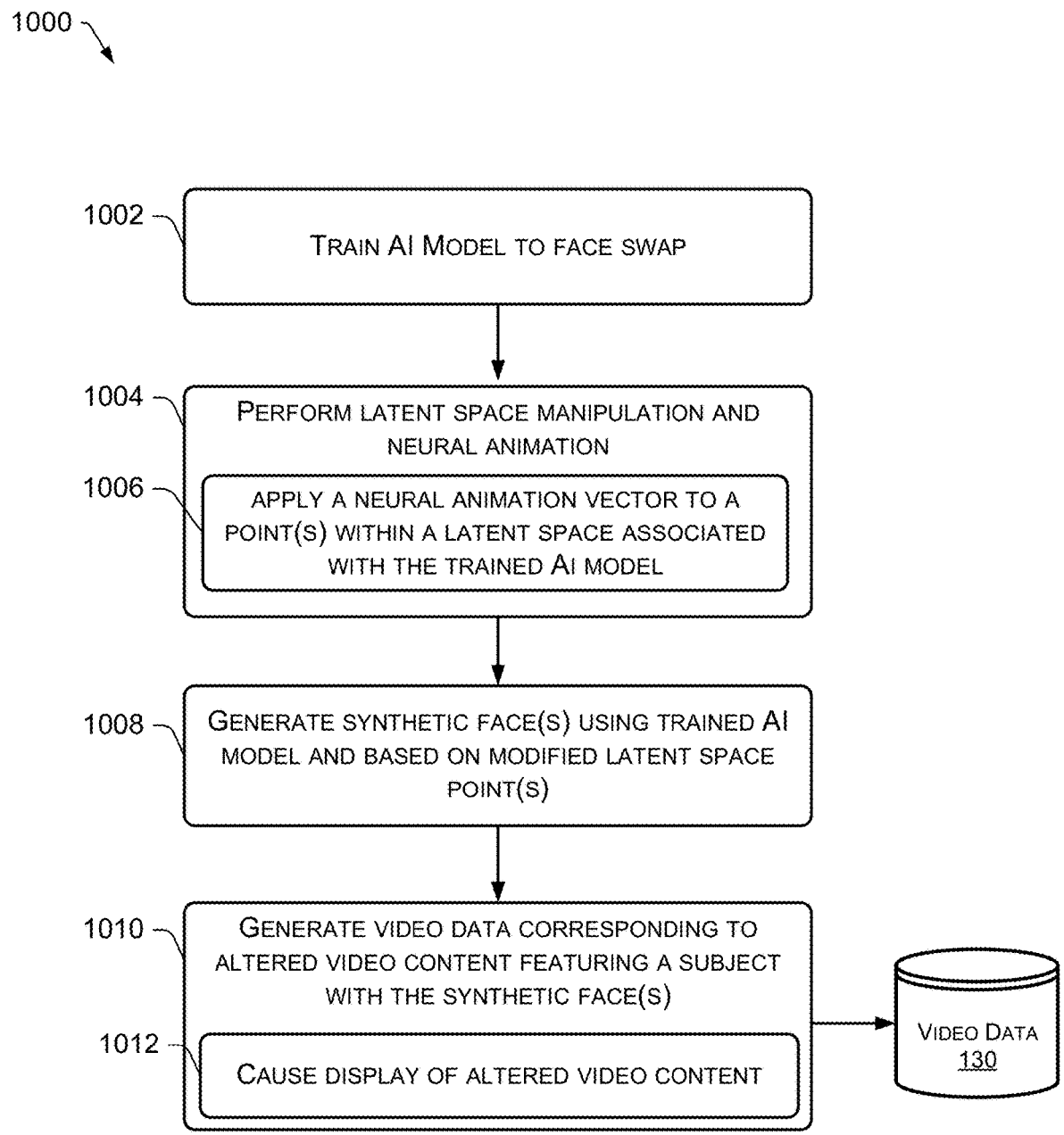
FIG. 10 is a flow diagram of another example process for using latent space manipulation and neural animation to generate hyperreal synthetic faces in altered video content.

FIG. 10 is a flow diagram of an example process 1000 for using latent space manipulation and neural animation 100 to generate hyperreal synthetic faces 102 in altered video content 106. The process 1000 may be implemented by one or more processors (e.g., a processor(s) of a computing system and/or computing device, such as the computing device 900 of FIG. 9). For discussion purposes, the process 1000 is described with reference to the previous figures.

At 1002, a processor(s) may train a machine learning model(s) (or AI model(s)) to generate a synthetic face(s) of a subject 114 (e.g., person) featured in unaltered video content 112. A trained machine learning model(s) 500 is obtained as a result of the training at block 1002. A training dataset that is used to train the machine learning model(s) 500 may include various types of data, as described herein.

In some examples, the training performed at block 1002 is based at least in part on video data of an actor making a mouth-generated sound. For example, a person 122 (e.g., an actor, such as a voice actor hired to record a voiceover for the altered video content 106) may be recorded with a video camera while making a mouth-generated sound, resulting in input video data of the person/actor 122 making the mouth-generated sound. Such input video data may include the audio data 110 as well as video frames depicting the person 122 (e.g., the face of the person 122) while making the mouth-generated sound (e.g., the spoken utterance 120). In some examples, the person/actor 122 is video recorded from positions/angles/views that are similar to the positions/angles/views from which the subject 114 was recorded in the unaltered video content 112 to achieve substantial alignment between the face of the person 122 in the input video data and the face of the subject 114 in the frames of the unaltered video content 112. In some examples, alignment modifications are performed on the input video data of the person/actor 122 to obtain aligned instances of the face of the person/actor 122 that are aligned with 2D representations of the face of the subject 114 in the unaltered video content 112. In other words, the machine learning model(s) may learn to face swap (e.g., to swap the aligned instances of the face of the person/actor 122 with a hyperreal synthetic face of the subject 114).

In some examples, the training performed at block 1002 is based at least in part on a 3D model of a face of the subject 114 that has been animated in accordance with the mouth-generated sound, as described herein. For example, the training dataset used for the training at block 1002 may include the aligned instances of the 3D model, as described herein. In some examples, at block 1002, the machine learning model(s) 500 is trained against the aligned instances of the 3D model that are aligned with the 2D footage of the unaltered video content 112. In other words, the machine learning model(s) may learn to face swap (e.g., to swap the aligned instances of the 3D model with a hyperreal synthetic face of the subject 114). In some examples, the animation of the 3D model is driven by the video data of the person/actor 122 making the mouth generated sound. In some examples, the animation of the 3D model is driven by input audio data 110 corresponding to the mouth-generated sound (e.g., an audio recording of the person/actor's 122 voice). In some examples, the animation of the 3D model is driven by input text data 110 corresponding to the mouth-generated sound.

At 1004, the processor(s) may perform latent space manipulation and neural animation 100. For example, at 1006, the processor(s) may apply a vector 400 to at least one point 502 within a latent space 402(A) associated with the trained machine learning model(s) 500 to obtain a modified latent space point 504. If face swapping is performed across multiple frames, the processor(s) may, on a frame-by-frame basis, apply the vector 400 (or possibly multiple different neural animation vectors) to multiple points 502 within the latent space 402(A) associated with the trained machine learning model(s) 500 to obtain multiple modified latent space points 504 across multiple frames.

At 1008, the processor(s) may use the trained machine learning model(s) 500 to generate the synthetic face 102 of the subject 114 (e.g., person) featured in the unaltered video content 112 based at least in part on this modified latent space point 504. If face swapping is performed across multiple frames, the trained machine learning model(s) 500 may be used to generate multiple instances of the synthetic face 102 based at least in part on the modified latent space points 504 obtained at block 1006. In other words, the trained machine learning model(s) 500 may generate instances of the synthetic face 102 over multiple frames, and may perform latent space manipulation and neural animation 100 to make the instances of the synthetic face 102 more natural-looking to improve the quality of the synthetic face(s) 102. As mentioned above, this can be done for individual frames as desired, or as a static offset across the entire set of frames that are to be used for the altered video content 106. The generation of the synthetic face(s) 102 using latent space manipulation and neural animation 100 at blocks 1004-1008 may include any of the operations described above with reference to FIGS. 4 and 5. The result after block 1008 is a more precise and accurate synthetic face 102 without requiring the subject 114 in the original footage to be over-expressive and without having to devise new strategies for re-training the machine learning model(s) 500 to achieve a desired result.

In some examples, the synthetic face(s) 102 generated at block 1008 may correspond to the aligned face(s) of the person/actor 122 or the aligned 3D model, as described above. In other words, the synthetic face(s) 102 may be in the same or similar orientation, the same or similar size, and/or at the same position in the frame as the aligned face(s) of the person/actor 122 or the aligned 3D model based on how the model(s) 500 was trained at block 1002.

At 1010, the processor(s) may generate, based at least in part on the unaltered video content 112, video data 130 corresponding to altered video content 106 featuring the subject 114 (e.g., person) with the synthetic face 102 making the mouth-generated sound (e.g., speaking the first spoken utterance). In some examples, the generating of the video data 130 at block 1010 includes overlaying the instances of the synthetic face 102 generated at block 1008 on the 2D representations of the face 116 depicted in the frames of the unaltered video content 112. In some examples, at block 1010 or afterwards, postproduction video editing may be performed to enhance the altered video content 106 in terms of color grading, adding highlights, skin texture, or the like, to make the altered video content 106 look as realistic as possible.

At 1012, the processor(s) may cause the altered video content 106 to be displayed on a display. For example, the video data 130 corresponding to the altered video content 106 may be stored in a datastore and accessed at any point in time for display on a computing device. For example, a user computing device may request access to the video data 130, and the video data 130 may be processed on the user computing device to display the altered video content 106 on a display of the user computing device. Such a user computing device may be any suitable type of device including a mobile phone, a tablet computer, a PC, a HMD, such as a VR headset or an AR headset, a game console and associated display, or any suitable type of user computing device with a display. In some examples, the video data 130 is made accessible over a network, such as a wide area network (e.g., the Internet). The altered video content 106 that is displayed may feature a synthetic face(s) 102 that hyperreal due to the enhanced facial expressions (e.g., mouth expressions) enabled through the use of latent space manipulation and neural animation 100 in combination with the remaining operations of the process 1000 described herein.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the disclosed techniques and systems in diverse forms thereof.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   training, by one or more processors, a machine learning model to generate a synthetic face of a person featured in unaltered video content to obtain a trained machine learning model, wherein the training is based at least in part on input video data of an actor speaking a spoken utterance or a three-dimensional (3D) model of a face of the person that has been animated in accordance with the spoken utterance;
   providing, by the one or more processors, two images of the face of the person to the trained machine learning model;
   receiving, by the one or more processors, two latent space points that correspond to the two images;
   determining, by the one or more processors, a neural animation vector based at least in part on a difference between the two latent space points;
   applying, by the one or more processors, the neural animation vector to points within a latent space associated with the trained machine learning model to obtain modified latent space points;
   generating, by the one or more processors, using the trained machine learning model, and based at least in part on the modified latent space points, instances of the synthetic face; and overlaying, by the one or more processors, the instances of the synthetic face on two-dimensional (2D) representations of the face depicted in frames of the unaltered video content to generate output video data corresponding to altered video content featuring the person with the synthetic face speaking the spoken utterance.

2. The method of claim 1, further comprising selecting, by the one or more processors, the two images from a training dataset that was used for the training of the machine learning model.

3. The method of claim 1, wherein the trained machine learning model is a first trained machine learning model, the method further comprising:
generating, by the one or more processors, using a second trained machine learning model, and based at least in part on audio data corresponding to the spoken utterance, a synthetic voice speaking the spoken utterance,
wherein the altered video content further features the synthetic voice speaking the spoken utterance.

4. The method of claim 1, wherein:
the spoken utterance is a first spoken utterance in a first spoken language; and
the unaltered video content features the person speaking a second spoken utterance in a second spoken language different than the first spoken language.

5. The method of claim 1, wherein:
the trained machine learning model is a second trained machine learning model;
the latent space is a first latent space of a first trained machine learning model;
the first latent space is associated with the second trained machine learning model based at least in part on the first latent space being synchronized with a second latent space of the second trained machine learning model;
the face is a second face; and
the points correspond to images of a first face different than the second face.

6. The method of claim 1, further comprising causing, by the one or more processors, the altered video content to be displayed on a display.

7. A method comprising:
training, by one or more processors, a machine learning model to generate a synthetic face of a subject featured in unaltered video content to obtain a second trained machine learning model, wherein the training is based at least in part on input video data of an actor making a mouth-generated sound or a three-dimensional (3D) model of a second face of the subject that has been animated in accordance with the mouth-generated sound;
applying, by the one or more processors, a neural animation vector to at least one point within a first latent space of a first trained machine learning model to obtain a modified latent space point, wherein the at least one point corresponds to an image of a first face different than the second face, and wherein the first latent space is associated with the second trained machine learning model based at least in part on the first latent space being synchronized with a second latent space of the second trained machine learning model;
generating, by the one or more processors, using the second trained machine learning model, and based at least in part on the modified latent space point, the synthetic face; and
generating, by the one or more processors, based at least in part on the unaltered video content, output video data corresponding to altered video content featuring the subject with the synthetic face making the mouth-generated sound.

8. The method of claim 7, further comprising:
animating, by the one or more processors, the 3D model based at least in part on audio data corresponding to the mouth-generated sound; and
aligning, by the one or more processors, the 3D model with a two-dimensional (2D) representation of the second face depicted in a frame of the unaltered video content to obtain an aligned 3D model having a facial expression based at least in part on the animating,
wherein the training is based at least in part on the aligned 3D model, and
wherein the synthetic face corresponds to the aligned 3D model.

9. The method of claim 7, further comprising determining the neural animation vector by:
providing, by the one or more processors, two images of the second face of the subject to the second trained machine learning model;
receiving, by the one or more processors, from the second trained machine learning model, two latent space points that correspond to the two images; and
determining, by the one or more processors, the neural animation vector based at least in part on a difference between the two latent space points.

10. The method of claim 9, further comprising selecting, by the one or more processors, the two images from a training dataset that was used for the training of the machine learning model.

11. The method of claim 7, the method further comprising:
generating, by the one or more processors, using a third trained machine learning model, and based at least in part on audio data corresponding to the mouth-generated sound, a synthetic voice making the mouth-generated sound,
wherein the altered video content further features the synthetic voice making the mouth-generated sound.

12. The method of claim 7, wherein:
the mouth-generated sound is a first spoken utterance; and
the unaltered video content features the subject with the second face speaking a second spoken utterance.

13. The method of claim 12, wherein:
the first spoken utterance is in a first spoken language; and
the second spoken utterance is in a second spoken language different than the first spoken language.

14. The method of claim 7, further comprising causing, by the one or more processors, the altered video content to be displayed on a display.

15. A system comprising:
one or more processors; and
memory storing computer-executable instructions that, when executed by the one or more processors, cause performance of operations comprising:
training a machine learning model to generate a synthetic face of a subject featured in unaltered video content to obtain a trained machine learning model, wherein the training is based at least in part on input video data of an actor making a mouth-generated sound or a three-dimensional (3D) model of a face of the subject that has been animated in accordance with the mouth-generated sound;

providing two images of the face of the subject to the trained machine learning model;
receiving, from the trained machine learning model, two latent space points that correspond to the two images;
determining a neural animation vector based at least in part on a difference between the two latent space points;
applying the neural animation vector to at least one point within a latent space associated with the trained machine learning model to obtain a modified latent space point;
generating, using the trained machine learning model, and based at least in part on the modified latent space point, the synthetic face; and
generating, based at least in part on the unaltered video content, output video data corresponding to altered video content featuring the subject with the synthetic face making the mouth-generated sound.

16. The system of claim 15, the operations further comprising:
animating the 3D model based at least in part on audio data corresponding to the mouth-generated sound; and
aligning the 3D model with a two-dimensional (2D) representation of the face depicted in a frame of the unaltered video content to obtain an aligned 3D model having a facial expression based at least in part on the animating,
wherein the training is based at least in part on the aligned 3D model, and
wherein the synthetic face corresponds to the aligned 3D model.

17. The system of claim 15, further comprising selecting the two images from a training dataset that was used for the training of the machine learning model.

18. The system of claim 15, wherein the trained machine learning model is a first trained machine learning model, the operations further comprising:
generating, using a second trained machine learning model, and based at least in part on audio data corresponding to the mouth-generated sound, a synthetic voice making the mouth-generated sound,
wherein the altered video content further features the synthetic voice making the mouth-generated sound.

19. The system of claim 15, wherein:
the trained machine learning model is a second trained machine learning model;
the latent space is a first latent space of a first trained machine learning model;
the first latent space is associated with the second trained machine learning model based at least in part on the first latent space being synchronized with a second latent space of the second trained machine learning model;
the face is a second face; and
the at least one point corresponds to an image of a first face different than the second face.

20. The system of claim 15, the operations further comprising causing the altered video content to be displayed on a display.

* * * * *